(12) United States Patent
Zhu et al.

(10) Patent No.: US 11,977,287 B2
(45) Date of Patent: May 7, 2024

(54) DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Heling Zhu, Beijing (CN); Jie Liu, Beijing (CN); Xin Li, Beijing (CN); Bo Han, Beijing (CN); Hai Tang, Beijing (CN); Jianwei Qin, Beijing (CN); Jian Sang, Beijing (CN); Lu Yu, Beijing (CN); Haiwei Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 415 days.

(21) Appl. No.: 17/309,489

(22) PCT Filed: Jan. 8, 2021

(86) PCT No.: PCT/CN2021/070848
§ 371 (c)(1),
(2) Date: Jun. 1, 2021

(87) PCT Pub. No.: WO2021/143619
PCT Pub. Date: Jul. 22, 2021

(65) Prior Publication Data
US 2023/0350242 A1  Nov. 2, 2023

(30) Foreign Application Priority Data
Jan. 16, 2020 (CN) .......................... 202010050987.3

(51) Int. Cl.
*G02F 1/1333* (2006.01)
*G02F 1/13* (2006.01)
(Continued)

(52) U.S. Cl.
CPC ...... *G02F 1/133308* (2013.01); *G02F 1/1323* (2013.01); *G02F 1/133512* (2013.01); *G02F 1/133528* (2013.01); *G02F 1/133606* (2013.01)

(58) Field of Classification Search
CPC ............. G02F 1/1323; G02F 1/133615; G02F 1/133308; G02F 1/133332; G02F 1/133322; G02F 1/133317
See application file for complete search history.

(56) References Cited

U.S. PATENT DOCUMENTS

| 10,539,738 B2 | 1/2020 | Shin et al. |
| 2005/0259193 A1* | 11/2005 | Sumiyoshi ............ G02F 1/1323 349/62 |

(Continued)

FOREIGN PATENT DOCUMENTS

| CN | 201218441 Y | 4/2009 |
| CN | 202394013 U | 8/2012 |

(Continued)

OTHER PUBLICATIONS

Extended European Search Report dated Feb. 15, 2023, for corresponding European Application No. 21728799.4.

*Primary Examiner* — Jia X Pan
(74) *Attorney, Agent, or Firm* — Kinney & Lange, P.A.

(57) ABSTRACT

A display device is provided, including: a back plate; a plastic frame connected to the back plate; a backlight module; a privacy film on a light emitting side of the backlight module; and a dimming sheet on a side of privacy film away from the back plate, wherein the dimming sheet (Continued)

is configured to be capable of adjusting a viewing angle of the display device. The plastic frame includes a first surface and a side end face, the first surface is a surface of the plastic frame close to the dimming sheet, the side end face is a side face of the plastic frame close to the dimming sheet, the plastic frame further includes a chamfered portion at a transition position between the side end face and the first surface, and the chamfered portion has a rough surface that is configured for diffracting the light incident on the chamfered portion.

18 Claims, 18 Drawing Sheets

(51) Int. Cl.
  *G02F 1/1335* (2006.01)
  *G02F 1/13357* (2006.01)

(56) References Cited

U.S. PATENT DOCUMENTS

| | | | | |
|---|---|---|---|---|
| 2006/0227569 | A1* | 10/2006 | Uehara | G02F 1/1323 362/561 |
| 2007/0058108 | A1* | 3/2007 | Uehara | G02B 6/0076 349/86 |
| 2010/0265435 | A1* | 10/2010 | Hwang | G02F 1/133504 349/64 |
| 2011/0255024 | A1* | 10/2011 | Chung | G02B 6/0088 349/58 |
| 2013/0016301 | A1* | 1/2013 | Hu | G02F 1/133502 349/58 |
| 2018/0059450 | A1 | 3/2018 | Li | |
| 2019/0243059 | A1 | 8/2019 | Shin et al. | |
| 2019/0346708 | A1 | 11/2019 | Wang et al. | |

FOREIGN PATENT DOCUMENTS

| | | | | |
|---|---|---|---|---|
| CN | 103605237 | A | | 2/2014 |
| CN | 105549236 | A | | 5/2016 |
| CN | 106773180 | A | | 5/2017 |
| CN | 107272261 | A | | 10/2017 |
| CN | 108303826 | A | | 7/2018 |
| CN | 207851474 | U | * 9/2018 | ....... G02F 1/133308 |
| CN | 109507819 | A | | 3/2019 |
| CN | 211454166 | U | | 9/2020 |
| EP | 2381298 | A2 | | 10/2011 |
| JP | 2007279437 | A | | 10/2007 |

* cited by examiner

DISPLAY DEVICE

CROSS-REFERENCE TO RELATED APPLICATION(S)

This application is a Section 371 National Stage Application of International Application No. PCT/CN2021/070848, filed on Jan. 8, 2021, entitled "DISPLAY DEVICE," which in turn claims priority to Chinese Application No. 202010050987.3, filed on Jan. 16, 2020, the disclosures of which are incorporated herein by reference in their entirety.

TECHNICAL FIELD

The present disclosure relates to the field of display technology, and in particular, to a display device.

BACKGROUND

With the development of display technology, more and more people will carry mobile display devices to read, study or work in public places. In order to effectively protect business secrets and personal privacy, the display device is required to have a privacy mode in which the viewing angle of the display device is relatively small. At the same time, in some cases, it is also necessary for the display device to have a sharing mode in which the viewing angle of the display device is relatively large so as to allow multiple people to view the content on the display screen together. In this way, a display device capable of switching between the privacy mode and the sharing mode is particularly important. However, in the current display device that is capable of switching between the privacy mode and the sharing mode, there are many undesirable phenomena, which have adverse effects on the display effect and may not meet the user's needs.

SUMMARY

To solve at least one aspect of the above-mention problems, the embodiments of the present disclosure provide a display device, including:
  a back plate:
  a plastic frame connected to the back plate;
  a backlight module on the back plate, wherein the backlight module is configured to emit light;
  a privacy film on a light emitting side of the backlight module; and
  a dimming sheet on a side of privacy film away from the back plate, wherein the dimming sheet is configured to be capable of adjusting a viewing angle of the display device,
  wherein the plastic frame comprises a first surface and a side end face, the first surface of the plastic frame is a surface of the plastic frame close to the dimming sheet and opposite to a light emitting surface of the dimming sheet, the side end face of the plastic frame is a side face of the plastic frame close to the dimming sheet, the plastic frame further includes a chamfered portion at a transition position between the side end face of the plastic frame and the first surface of the plastic frame, the chamfered portion has a rough surface, and is configured for diffracting the light incident on the chamfered portion.

According to some exemplary embodiments, the display device further includes:
  a flexible circuit board, the flexible circuit board includes a flexible circuit board body, a first contact portion and a second contact portion on the flexible circuit board body,
  wherein the dimming sheet includes a first electrode and a second electrode, the first electrode and the second electrode are in electrical contact with the first contact portion and the second contact portion, respectively,
  wherein the dimming sheet comprises a first side face close to the flexible circuit board, the first electrode includes a first electrode part and a second electrode part, the second electrode part and the first electrode part are located on both sides of the first side face in a direction perpendicular to the first side face, and the first electrode part is protruded toward the flexible circuit board relative to the first side face; and
  wherein the second electrode includes a third electrode part and a fourth electrode part, the third electrode part and the fourth electrode part are located on both sides of the first side face in the direction perpendicular to the first side face, and the third electrode part is protruded toward the flexible circuit board relative to the first side face.

According to some exemplary embodiments, the dimming sheet includes:
  a first substrate and a second substrate opposite to each other;
  a first conductive layer on a side of the first substrate close to the second substrate;
  a second conductive layer on a side of the second substrate close to the first substrate;
  a dimming function layer between the first conductive layer and the second conductive layer,
  wherein the first electrode is located on a surface of the first conductive layer close to the dimming function layer, the second electrode is located on a surface of the second conductive layer close to the dimming function layer, the first contact portion is located on a surface of the flexible circuit board body facing the first conductive layer, and the second contact portion is located on a surface of the flexible circuit board body facing the second conductive layer.

According to some exemplary embodiments, the display device further includes a light shielding component on at least one of the back plate, the plastic frame and the dimming sheet.

According to some exemplary embodiments, the dimming sheet includes a side end face close to the plastic frame, the light shielding component includes a first light shielding component on the first surface of the plastic frame, the first light shielding component includes a first light shielding sub-component and a second light shielding sub-component, the first light shielding sub-component covers at least a part of the first surface of the plastic frame, and the second light shielding sub-component covers at least a part of the side end face of the dimming sheet.

According to some exemplary embodiments, the first light shielding sub-component extends parallel to the light emitting surface of the dimming sheet, and the second light shielding sub-component extends perpendicular to the light emitting surface of the dimming sheet.

According to some exemplary embodiments, the light shielding component includes a second light shielding component on at least one of the first surface of the plastic frame and the side face of the back plate close to the dimming sheet.

According to some exemplary embodiments, the second light shielding component includes black foam.

According to some exemplary embodiments, the light shielding component includes a third light shielding component on the side end face of the dimming sheet.

According to some exemplary embodiments, the third light shielding component includes black ink; alternatively, the third light shielding component includes a frame sealant, the frame sealant is located between the first conductive layer and the second conductive layer to encapsulate the dimming function layer.

According to some exemplary embodiments, the light shielding component includes a fourth light shielding component on the light emitting surface of the dimming sheet, and an orthographic projection of the fourth light shielding component on the back plate falls within an orthographic projection of the plastic frame on the back plate.

According to some exemplary embodiments, each one of the first light shielding component and the fourth light shielding component comprises a black tape.

According to some exemplary embodiments, the backlight module includes a plurality of optical film layers, an orthographic projection of at least one of the plurality of optical film layers and the privacy film covers an orthographic projection of the dimming sheet on the back plate, and an area of the orthographic projection of at least one of the plurality of optical film layers and the privacy film is greater than an area of the orthographic projection of the dimming sheet on the back plate.

According to some exemplary embodiments, the privacy film includes a first surface close to the backlight module and a second surface close to the dimming sheet, at least one of the first surface of the privacy film and the second surface of the privacy film is a rough surface.

According to some exemplary embodiments, the display device further includes a polarizer on a side of the dimming sheet away from the privacy film, a surface of the polarizer close to the dimming sheet is a rough surface.

According to some exemplary embodiments, the dimming sheet further includes:
anti-absorption particles on a surface of the dimming sheet close to the privacy film, and anti-absorption particles on a surface of the dimming sheet close to the polarizer.

According to some exemplary embodiments, an area of the first electrode part on the first substrate is smaller than or equal to an area of the second electrode part on the first substrate; and/or an area of the third electrode part on the second substrate is smaller than or equal to an area of the fourth electrode part on the second substrate.

According to some exemplary embodiments, a width of the first electrode part in a direction perpendicular to the first side face of the dimming sheet is smaller than or equal to a width of the second electrode part in a direction perpendicular to the first side face of the dimming sheet; and/or a width of the third electrode part in a direction perpendicular to the first side face of the dimming sheet is smaller than or equal to a width of the fourth electrode part in a direction perpendicular to the first side face of the dimming sheet.

According to some exemplary embodiments, a length of the first electrode part in a direction parallel to the first side face of the dimming sheet is smaller than or equal to a length of the second electrode part in a direction parallel to the first side face of the dimming sheet; and/or a length of the third electrode part in a direction parallel to the first side face of the dimming sheet is smaller than or equal to a length of the fourth electrode part in a direction parallel to the first side face of the dimming sheet.

According to some exemplary embodiments, a length of the first electrode part in a direction parallel to the first side face of the dimming sheet is 3-10 times of a width of the first electrode in a direction perpendicular to the first side face of the dimming sheet; and/or a length of the second electrode part in a direction parallel to the first side face of the dimming sheet is 3-10 times of a width of the second electrode in a direction perpendicular to the first side face of the dimming sheet.

According to some exemplary embodiments, a ratio of the area of the orthographic projection of the first electrode part on the first substrate to the area of the orthographic projection of the second electrode part on the first substrate is in a range of $2/3$-$4/5$; and/or
a ratio of the area of the orthographic projection of the third electrode part on the second substrate to the area of the orthographic projection of the fourth electrode part on the second substrate is in a range of $2/3$-$4/5$.

According to some exemplary embodiments, a side face of the first electrode whose orthographic projection on the first substrate that is close to the orthographic projection of the second electrode on the first substrate completely overlaps with a side face of the second electrode whose orthographic projection on the first substrate that is close to the orthographic projection of the first electrode on the first substrate.

According to some exemplary embodiments, the orthographic projection of the first electrode on the first substrate and the orthographic projection of the second electrode on the first substrate are separated by a predefined distance.

According to some exemplary embodiments, the predefined distance is greater than or equal to 40 mm.

According to some exemplary embodiments, the first conductive layer further includes a notch portion, and the notch portion of the first conductive layer is recessed inward relative to the first side face of the dimming sheet.

According to some exemplary embodiments, the second conductive layer further includes a notch portion, and the notch portion of the second conductive layer is recessed inward relative to the first side face of the dimming sheet According to some exemplary embodiments, the first substrate includes a notch portion, an orthographic projection of the notch portion of the first conductive layer on the first substrate, an orthographic projection of the second electrode on the first substrate and the notch portion of the first substrate overlap with each other.

According to some exemplary embodiments, the second substrate includes a notch portion, an orthographic projection of the notch portion of the second conductive layer on the second substrate, an orthographic projection of the first electrode on the second substrate and the notch portion of the second substrate overlap with each other.

According to some exemplary embodiments, the dimming function layer includes a notch portion, an orthographic projection of the notch portion of the dimming function layer on the first substrate covers an orthographic projection of the first electrode on the first substrate and an orthographic projection of the second electrode on the first substrate.

According to some exemplary embodiments, each one of the first conductive layer and the second conductive layer comprises a planar electrode, a grid-shaped electrode, a annular electrode or a strip electrode.

BRIEF DESCRIPTION OF THE DRAWINGS

Through the following description of the present disclosure with reference to the accompanying drawings, other purposes and advantages of the present disclosure will be apparent and may help for a comprehensive understanding of the present disclosure.

Figure 1:
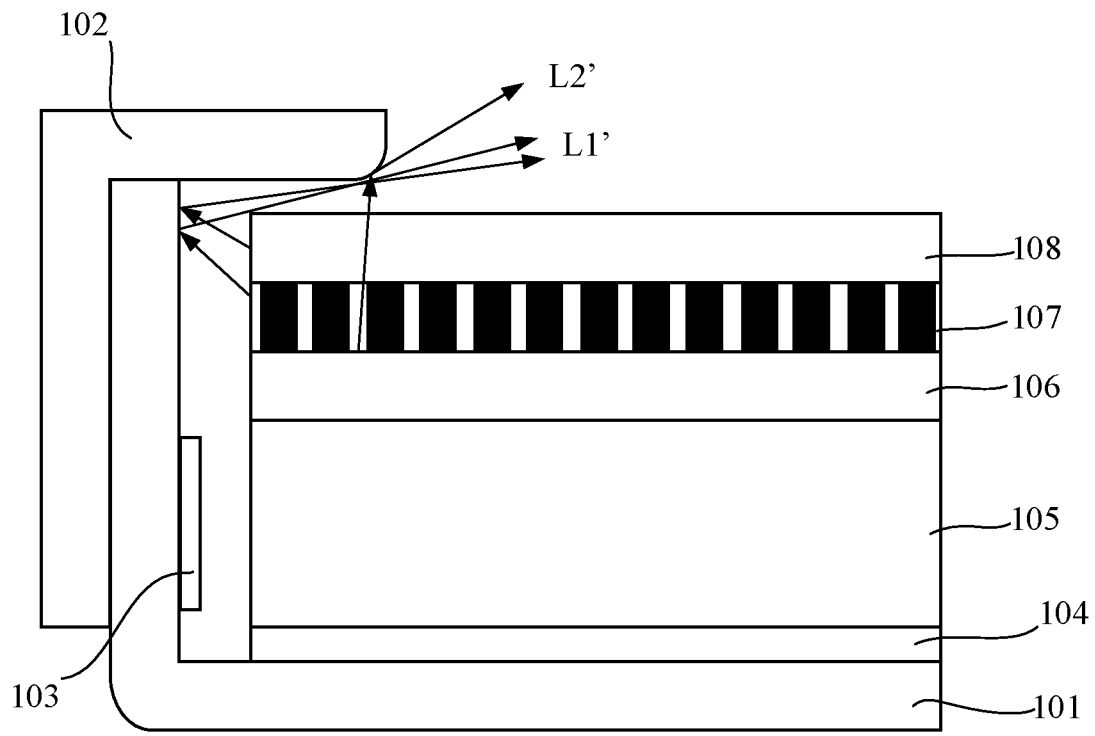
FIG. 1 is a schematic diagram of the structure of a display device in the related art.

It should be noted that, for clarity, in the drawings used to describe the embodiments of the present disclosure, sizes of layers, structures, or regions may be enlarged or reduced, that is, these drawings are not drawn according to actual scales.

DETAILED DESCRIPTION OF EMBODIMENTS

In order to make the objectives, technical solutions, and advantages of the embodiments of the present disclosure more apparent, the technical solutions of the embodiments of the present disclosure will be described clearly and completely in conjunction with the accompanying drawings of the embodiments of the present disclosure. Obviously, the described embodiments are part of the embodiments of the present disclosure, rather than all of the embodiments. Based on the described embodiments of the present disclosure, all other embodiments obtained by those of ordinary skill in the art without creative labor are within the protection scope of the present disclosure.

Unless otherwise defined, the technical terms or scientific terms used in the present disclosure shall have the usual meanings understood by those of ordinary skill in the art. "First", "second" and similar words used in the present disclosure do not indicate any order, quantity or importance, but are only used to distinguish different components. "Include" or "comprise" and other similar words indicate that the element or item appearing before the word covers the elements or items and their equivalents listed after the word, but does not exclude other elements or items. "Up", "down", "left", "right", etc. are only used to indicate a relative position relationship. When an absolute position of the described object changes, the relative position relationship may also change correspondingly.

In this context, a XYZ coordinate system is established to facilitate the description of the relative positional relationships between various layers, components, elements or members. Unless otherwise specified, in the dimming sheet, the dimming sheet assembly, the backlight module, and the display device according to the embodiments of the present disclosure, the Z direction refers to a direction perpendicular to the substrate of the dimming sheet, or in other words, the Z direction refers to a stacking direction of various layers of the dimming sheet; the X direction refers to a direction in which the long sides of the various layers of the dimming sheet extend, and the Y direction refers to the direction in which the short sides of the various layers of the dimming sheet extend, that is, the various layers of the dimming sheet are extended in the XY plane.

In this context, an expression "rough surface" means a surface with a certain surface roughness. Generally, surface roughness refers to an unevenness of small intervals and small peaks and valleys on the surface. A distance (wave distance) between two peaks or two valleys is very small (below 1 mm), which is a microscopic geometric shape error. It should be understood that the smaller the surface roughness is, the smoother the surface will be. Unless otherwise specified, in this context, the expression "rough surface" is distinguished from a smooth surface, and it refers to a surface with a surface roughness greater than 0.1 μm.

FIG. 1 is a schematic diagram of a structure of a display device in the related art. As shown in FIG. 1, the display device 100 may include a back plate 101, a plastic frame 102, a light source 103, a reflective sheet 104, a light guide plate 105, an optical film layer including a diffusion sheet 106, a privacy film 107, and a dimming sheet 108. Through a cooperation of the privacy film 107 and the dimming sheet 108, the display device 100 may switch between the privacy mode and the sharing mode. When the display device 100 is in the privacy mode, the dimming sheet 108 is in a transparent state; when the display device 100 is in the sharing mode, the dimming sheet 108 is in a mist state.

Figure 2:
FIG. 2 schematically shows the phenomenon of side bright stripes of the display device in the related art.

However, in an actual display process, the display device 100 is prone to form side bright stripes, as shown in FIG. 2, which affects a display effect. In particular, when the display device 100 is in the privacy mode, the dimming sheet 108 is in the transparent state, and the displayed image observed at a wide viewing angle should appear black. However, due to the presence of side bright stripes, the displayed image observed at a wide viewing angle includes the side bright stripes, which affects the display effect in the privacy mode. The inventor found, through research, that there are two main sources of the side bright stripes. One part of the side bright stripes comes from edge light of the privacy film. Specifically, referring to FIG. 1, a part of the light is emitted from an edge of the privacy film 107 (mainly a side end face of the privacy film 107) and/or an edge of the dimming sheet 108 (mainly a side end face of the dimming sheet 108), and through a reflection of the back plate 101 and/or the plastic frame 102, it is emitted from an edge of the plastic frame 102 to form a bright line with a large angle, as shown by the light L1' in the drawing. The other part comes from the light emitted from a slit of the privacy film. Specifically, referring to FIG. 1, a part of the light is emitted from a slit of the privacy film 107, after being reflected by an edge of the plastic frame 102, a bright line with a large angle is formed, as shown by the light L2' in the drawing.

In order to reduce or even eliminate the above-mentioned side bright stripe phenomenon, embodiments of the present disclosure provide a display device.

Figure 3:
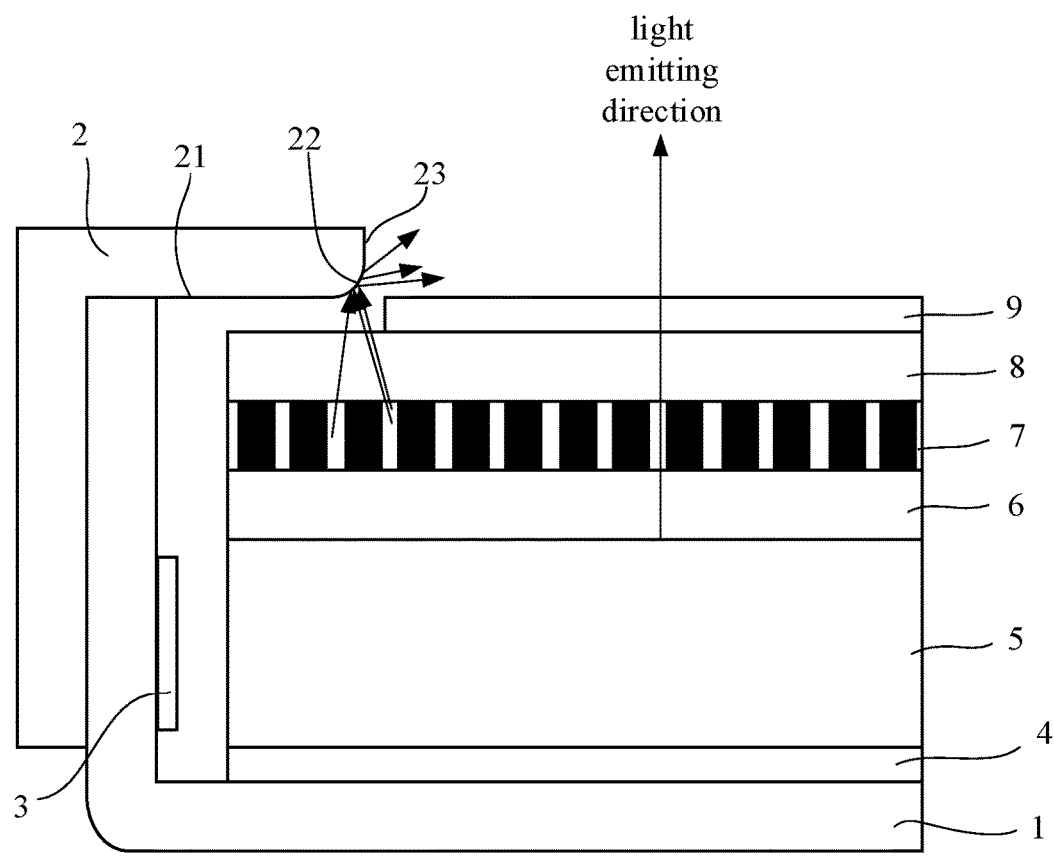
FIG. 3 is a schematic structural diagram of a display device according to embodiments of the present disclosure.

FIG. 3 is a schematic structural diagram of a display device according to the embodiments of the present disclosure. As shown in FIG. 3, the display device 10 may include a back plate 1, a plastic frame 2, a light source 3, a reflective sheet 4, a light guide plate 5, an optical film layer including a diffusion sheet 6, a privacy film 7, a dimming sheet 8, a display panel 9 and other components.

Through a cooperation of the privacy film 7 and the dimming sheet 8, the display device 10 may switch between the privacy mode and the sharing mode.

As shown in FIG. 3, a light from the light source 3, passes through the light guide plate 5, the reflective sheet 4, and the optical film layer including the diffuser sheet, then is emitted out toward a direction where the display panel 9 is located (an upward direction in FIG. 3).

In this context, for ease of description, a module composed of the light source 3, the reflective sheet 4, the light guide plate 5, and the optical film layer including the diffusion sheet 6 is referred to as a backlight module. It should be noted that, in this context, only an edge-type backlight module is taken as an example to describe the embodiments of the present disclosure in detail. However, it should be understood that the embodiments of the present disclosure are not limited to the edge-type backlight module, and may also be applied to other types of backlight modules including direct-type backlight module, etc. Depending on different types of backlight modules, components included therein will also change correspondingly. It should be understood that the backlight module is configured to emit light for the display device to display images.

In addition, it should be noted that the optical film layer may also include a composite brightness enhancement film, a diffusion sheet, a prism sheet and other film layers, which is not particularly limited here, and may be provided according to actual operating requirements of the display device.

As shown in FIG. 3, the privacy film 7, the dimming sheet 8, and the display panel 9 are sequentially arranged on a light emitting side of the backlight module, that is, the privacy film 7, the dimming sheet 8 and the display panel 9 are arranged in sequence in a light emitting direction of the backlight module (the upward direction in FIG. 3).

Continuing to refer to FIG. 3, the privacy film 7 may be arranged on the light emitting side of the backlight module, which may allow light that is within a small viewing angle range (for example, light with a viewing angle within ±45°) to pass through, but do not allow light that is within a wide viewing angle range (for example, light with a viewing angle exceeding ±45°) to pass through.

Figure 4:
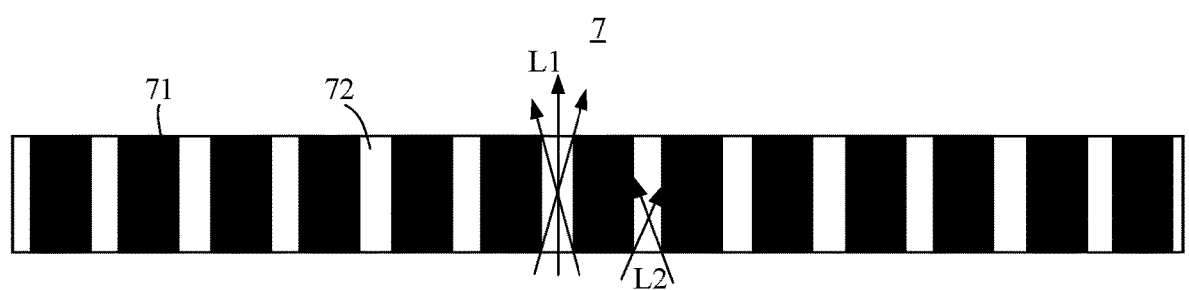
FIG. 4 is a schematic structural diagram of a privacy film according to embodiments of the present disclosure.

For example, FIG. 4 is a schematic structural diagram of a privacy film according to the embodiments of the present disclosure. Referring to FIG. 4, the privacy film 7 may include light shielding structures 71 arranged at intervals and light transmitting structures 72 arranged between adjacent light shielding structures 71. For example, a light transmitting structure 72 may be a gap left between the light shielding structures 71 arranged at intervals, that is, the light transmitting structure 72 may be a gap. Optionally, the gap may be filled with a transparent material, for example, a transparent colloid may be filled, that is, the light transmitting structure 72 may be a transparent material portion. As shown in FIG. 4, when light that is within a small viewing angle range (for example, light L1 shown in FIG. 4) is emitted into the privacy film 7, it may be emitted from the light transmitting structure 72; when light that is within a wide viewing angle range (for example, light L2 shown in FIG. 4) is emitted into the privacy film 7, it is blocked by the light shielding structure 71 and may not be emitted from the privacy film 7.

Referring back to FIG. 3, the dimming sheet 8 may include a dimming function layer having electric control light switching characteristics under an action of an electric field. For example, under the action of the electric field, the dimming function layer may be in a transparent state, and under the action of no electric field, the dimming function layer may be in a mist state.

For example, the dimming sheet 8 may include Polymer Dispersed Liquid Crystal (referred to as PDLC for short). The so-called polymer dispersed liquid crystal refers to the liquid crystal dispersed in the organic solid polymer substrate in micron-sized droplets. Since an optical axis of the small droplet composed of liquid crystal molecules is in free orientation, a refractive index thereof does not match a refractive index of the substrate, thus, when light passes through the substrate, it is strongly scattered by the droplet and presents an opaque milky white state or a translucent state (also called a mist state). By applying an electric field to the dimming sheet 8, the electric field may adjust the optical axis orientation of the small droplets composed of liquid crystal molecules. When the refractive index of the small droplets composed of liquid crystal molecules matches the refractive index of the substrate, the layer may present a transparent state, that is, light may pass through the layer. Therefore, the polymer dispersed liquid crystal layer has electric control light switching characteristics under the action of the electric field.

For another example, the dimming sheet 8 may include Polymer Network Liquid Crystal (PNLC for short). In PNLC, the liquid crystal is not spherical (or ellipsoidal) droplets, but is distributed in a three-dimensional polymer network to form a continuous channel network. Similar to PDLC, the PNLC layer also has electric control light switching characteristics under the action of an electric field.

For yet another example, the dimming sheet 8 may include Polymer-Stabilized Liquid Crystal (PSLC for short). Similar to PDLC, the PSLC layer also has electric control light switching characteristics under the action of an electric field.

It should be understood that, the dimming sheet 8 is not limited to the above-mentioned examples, it may include any dimming function layer that has electric control light switching characteristics under the action of an electric field.

In the display device according to the embodiments of the present disclosure, for example, when the dimming sheet 8 includes a PDLC layer, the electric field applied to the dimming sheet 8 may adjust the optical axis orientation of the small droplets composed of liquid crystal molecules. When the refractive index of the small droplets composed of liquid crystal molecules matches the refractive index of the substrate, the PDLC layer may present a transparent state. In this state, only part of the light emitted from the light source of the backlight module that is within a certain viewing angle range (for example, within ±45°) may pass through the privacy film 7. This part of the light may refer to the light L1 as shown in FIG. 4, and then this part of the light sequentially passes through the dimming sheet 8 and the display panel 9 in the transparent state, so that the viewing angle of the display device 10 is limited within the certain viewing angle range, that is, the display device 10 is in the privacy mode. When the application of an electric field to the dimming sheet 8 is stopped, the optical axis of the small droplet composed of liquid crystal molecules is in free orientation, and its refractive index does not match the refractive index of the substrate, and the dimming sheet 8 is in a mist state. In this state, although only part of the light emitted from the light source of the backlight module that is within a certain viewing angle range (for example, within ±45°) may pass through the privacy film 7, this part of the light may refer to the light L1 as shown in FIG. 4, however, after this part of the light passes through the dimming sheet 8 in the mist state, they are diffused by the dimming sheet 8 in the mist state into light that is within a wide viewing angle range, thereby expanding the viewing angle of the display device 10, that is, the display device 10 is in the sharing mode.

The display device according to the embodiments of the present disclosure may include a light dispersing component, which may disperse the light emitted from the edge of the plastic frame 2. In the display device according to the embodiments of the present disclosure, by providing such a light dispersing component, the light emitted from the edge of the plastic frame may be dispersed, so that the side bright stripe phenomenon described above may at least be reduced.

For example, as shown in FIG. 3, the plastic frame 2 includes a side end face 23 close to the dimming sheet 8, and the light dispersing component may be located at a transition position between the side end face 23 of the plastic frame 2 and a first side 21 of the plastic frame 2. Specifically, the light dispersing component includes a chamfered portion 22 located at a transition position between the side end face 23 of the plastic frame 2 and the first surface 21 of the plastic frame 2, for example, the chamfered portion 22 may be round and chamfered. The chamfered portion 22 may be sandblasted, that is, a rough surface is formed at the chamfered portion 22 to disperse the light incident on the chamfered portion. Specifically, at least a part of the light emitted from at least one of the side end face of the privacy film 7, the side end face of the dimming sheet 8, and the light transmitting structure 72 of the privacy film 7 directly enters the chamfered portion 22 or enters the chamfered portion 22 after being reflected. The light incident on the chamfered portion 22 is scattered in all directions after being reflected by the rough surface, thereby realizing the purpose of dispersing the light. In this way, the light emitted from at least one of the side end face of the privacy film 7, the side end face of the dimmer sheet 8, and the light transmitting structure 72 of the privacy film 7 will not be concentrated and emitted in one direction, so that the side bright stripe phenomenon described above may at least be reduced.

In the context, the first surface of the plastic frame may be the surface of the plastic frame that is close to the dimming sheet and opposite to a light emitting surface of the dimming sheet, the side end face of the plastic frame is a side face that is located at one end of the plastic frame close to the dimming sheet, and the edge of the plastic frame may include a chamfered portion 22 and a portion adjacent to the chamfered portion 22.

The display device according to the embodiments of the present disclosure may further include a light shielding component, the light shielding component is configured to block the light emitted from at least one of the side end face of the privacy film 7, part of the light transmitting structure of the privacy film 7, and the side end face of the dimming sheet 8 to exit the display device. For example, the light shielding component may block the light emitted from at least one of the side end face of the privacy film 7, the side end face of the dimming sheet 8, and at least a part of the light transmitting structure 72 of the privacy film 7 to exit through the edge of the plastic frame 2. In the display device according to the embodiments of the present disclosure, by providing such a light shielding component, the above-mentioned side bright stripe phenomenon may be reduced or even eliminated.

Figure 5:
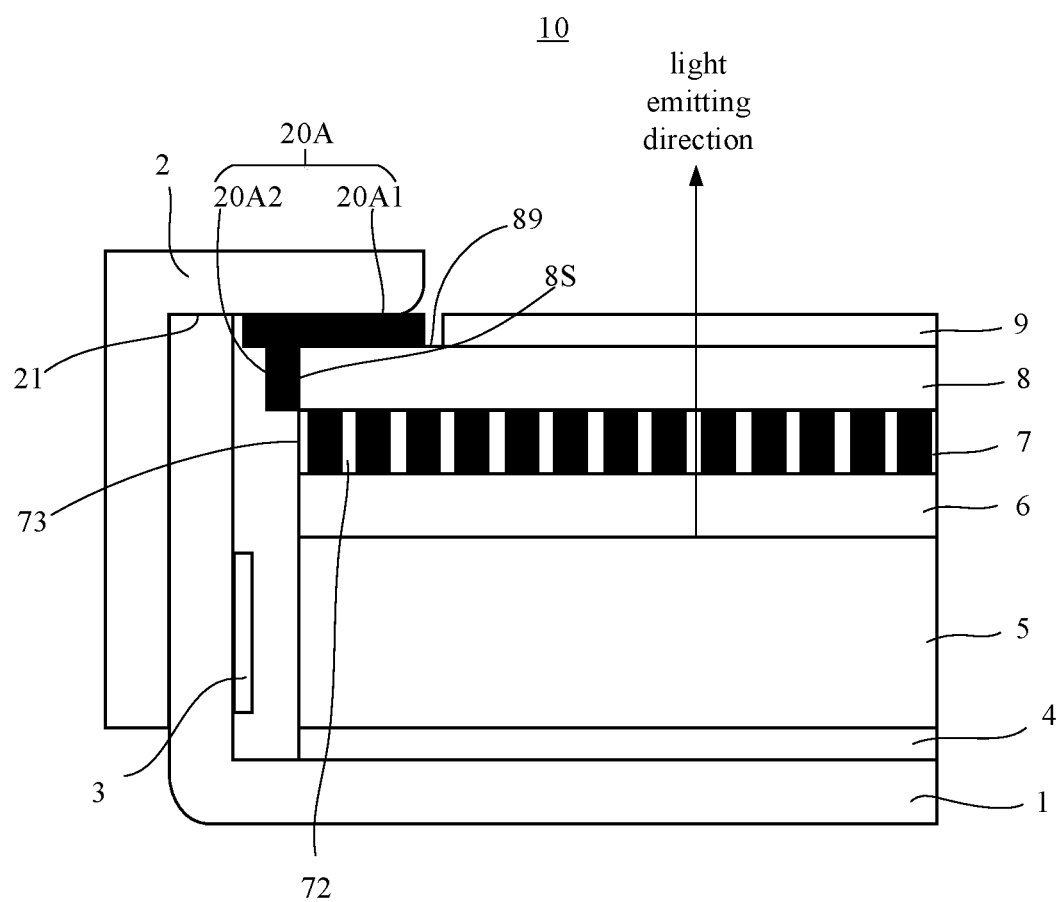
FIG. 5 is a schematic structural diagram of a display device according to embodiments of the present disclosure.

As shown in FIG. 5, the light shielding component may include a first light shielding component 20A on the plastic frame 2. For example, the first light shielding component 20A may be a black tape. The first light shielding component 20A is attached to the first surface 21 of the plastic frame 2, the first surface 21 of the plastic frame 2 is a surface of the plastic frame 2 close to the dimming sheet 8 (a lower surface shown in FIG. 5), and the first surface 21 is opposite to a light emitting surface 89 of the dimming sheet 8 (an upper surface shown in FIG. 5).

Optionally, a cross section of the first light shielding component 20A in a direction perpendicular to the light emitting surface of the dimming sheet 8 may have a T-shape. Specifically, as shown in FIG. 5, the first light shielding component 20A may include a first light shielding sub-component 20A1 extending parallel to the light emitting surface of the dimming sheet 8 and a second light-shielding sub-component 20A2 extending perpendicular to the light emitting surface of the dimming sheet 8, that is, an extension direction of the second light shielding sub-component 20A2 is perpendicular to the first light shielding sub-component 20A1. The first light shielding sub-component 20A1 is attached to the lower surface of the plastic frame 2, and the second light shielding sub-component 20A2 extends from the first light shielding sub-component 20A1 toward the dimming sheet 8. For example, the second light shielding sub-component 20A2 may block at least a part of the dimming sheet 8 that is close to the plastic frame 2.

It should be noted that, in this context, the light emitting surface of the dimming sheet means a main light emitting surface of the dimming sheet, that is, most of the light incident on the dimming sheet exit from the light emitting surface of the dimming sheet. With reference to FIG. 5, the upper surface of the dimming sheet 8 is the light emitting surface thereof.

Referring to FIGS. 1 and 5 in conjunction, the privacy film 7 includes a side end face 73 close to the plastic frame 2 and a light transmitting structure 72 adjacent to the side end face of the plastic frame, and the dimming sheet 8 includes a side end face 8S close to the plastic frame 2. By providing the first light shielding member 20A, it is possible to block the light (for example, the light L1', L2' shown in FIG. 1) emitted from the edge of the privacy film 7 (for example, the side end face 73), the edge of the dimming sheet 8 (for example, the side end face 8S), and the light transmitting structure 72 of the privacy film close to the side end face thereof from exiting through the edge of the plastic frame 2, thereby reducing or even eliminating the above-mentioned side bright stripe phenomenon.

Figure 6:
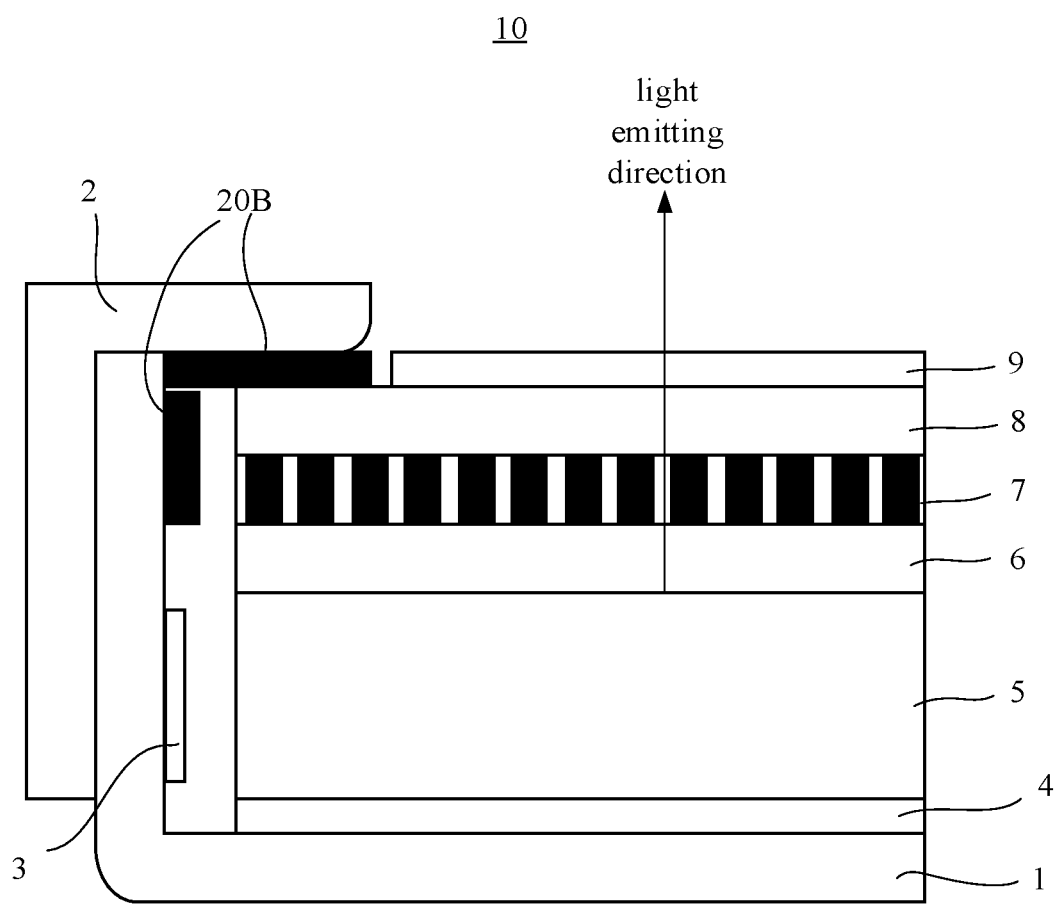
FIG. 6 is a schematic structural diagram of a display device according to embodiments of the present disclosure.

As shown in FIG. 6, the light shielding component may include a second light shielding component 20B provided on the plastic frame 2. For example, the second light shielding component 20B may be a black foam. The second light shielding component 20B may be provided on the first surface 21 (the lower surface shown in FIG. 6) of the plastic frame 2. Alternatively or additionally, the second light shielding component 20B may be provided on a side face of the back plate 1 close to the dimming sheet 8 (an inner side face shown in FIG. 6).

It should be understood that the second light-shielding component 20B may function similar to the first light-shielding component 20A, and will not be repeated here.

Figure 7:
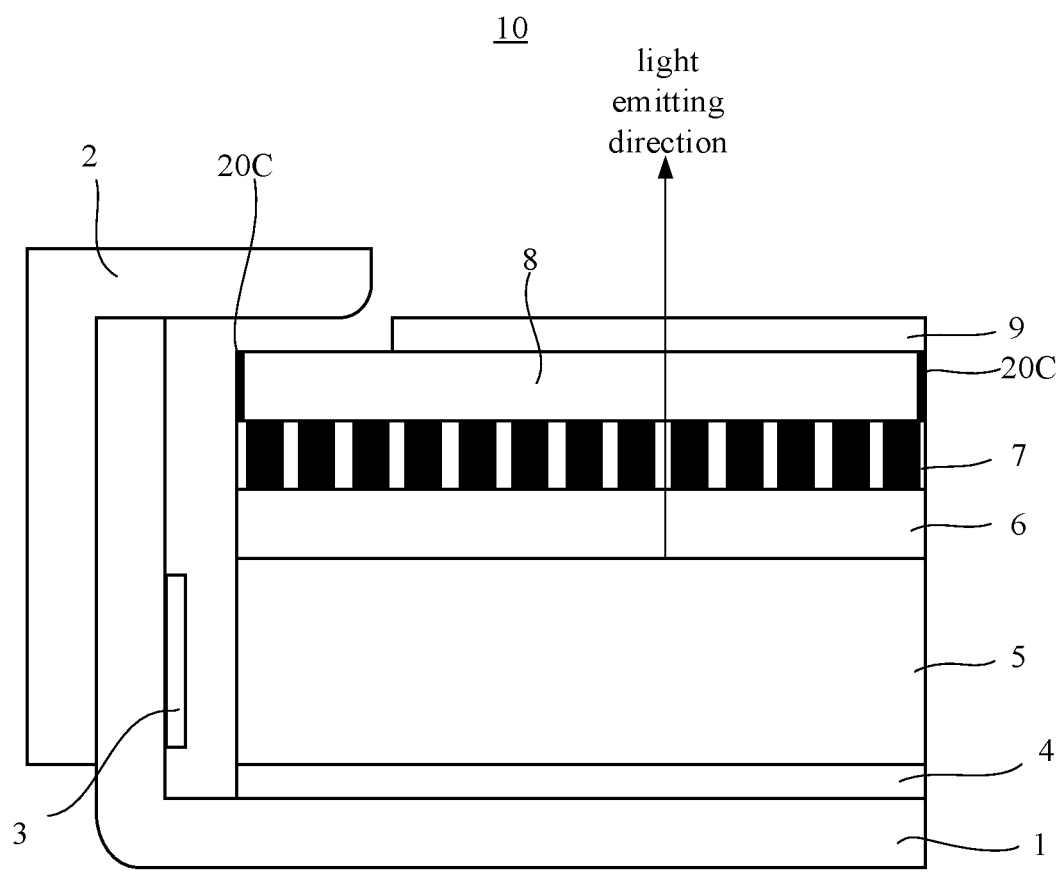
FIG. 7 is a schematic structural diagram of a display device according to embodiments of the present disclosure.

As shown in FIG. 7, the light shielding component may include a third light shielding component 20C on the dimming sheet 8. For example, the third light shielding component 20C may be black ink. The third light shielding component 20C may be coated on the side end face 8S of the dimming sheet 8 close to the back plate 1 (for example, refer to FIG. 5). By providing the third light shielding component 20C, it is possible to prevent light from exiting from the side end face of the dimming sheet 8, so as to reduce an amount of light exiting from the edge of the plastic frame 2, thereby at least reducing the side bright stripe phenomenon.

For example, the third light shielding member 20C may be formed through a process of coating black ink on the end face of the dimming sheet 8. Specifically, for example, a plurality of (for example, 10) dimming sheets may be stacked together, and their end faces may be placed in an ink cartridge containing black ink. After the end faces are coated with ink, they may be cured by UV light irradiation. Through such a process, the problem of side bright stripe may be solved, and a delamination phenomenon of the dimming sheet under long-term high-temperature working environment may be avoided.

Figure 8:
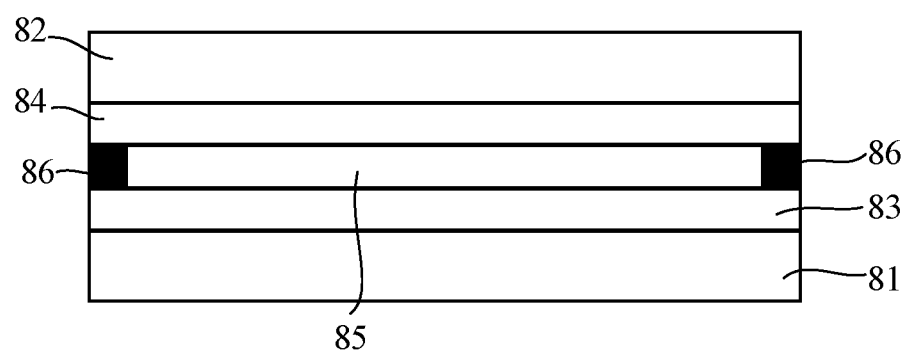
FIG. 8 is a schematic structural diagram of a dimming sheet according to embodiments of the present disclosure.

FIG. 8 is a schematic structural diagram of a dimming sheet according to the embodiments of the present disclosure. As shown in FIG. 8, the dimming sheet 8 may include: a first substrate 81 and a second substrate 82 disposed oppositely; a first conductive layer 83 on a side of the first substrate 81 close to the second substrate 82; a second conductive layer 84 on a side of the substrate 82 close to the first substrate 81; and a dimming function layer 85 between the first conductive layer 83 and the second conductive layer 84. For example, the dimming function layer 85 may be a PDLC layer.

As shown in FIG. 8, the dimming sheet 8 may also include a frame sealant 86, which is also provided between the first conductive layer 83 and the second conductive layer 84, located on the same layer as the dimming function layer 85, and is used to encapsulate the dimming function layer 85. In addition, the frame sealant 86 is composed of a light shielding material (for example, black frame sealant), and is used to prevent light from exiting through the side end face of the dimming sheet 8, so as to reduce the amount of light exiting from the edge of the plastic frame 2 so as to at least reduce the above-mentioned side bright stripe phenomenon.

For example, a following process may be used to form the dimming sheet 8 with the frame sealant 86. First, liquid crystal polymer is roll-coated on one of the first conductive layer 83 and the second conductive layer 84 until the liquid crystal polymer layer is uniform; the frame sealant is formed on the other of the first conductive layer 83 and the second conductive layer 84 through a dispensing process. Then, the two conductive layers are aligned and assembled, and cured with UV light for 5 minutes in a temperature environment of 15° to 25° to form the dimming sheet 8 with the frame sealant 86.

In other words, the light shielding component may include the frame sealant 86 provided in the dimming sheet 8. The frame sealant 86 is on the same layer with the dimming function layer 85 and encapsulates the dimming function layer 85 to prevent the light from exiting through the side end face of the dimming sheet 8.

Figure 9:
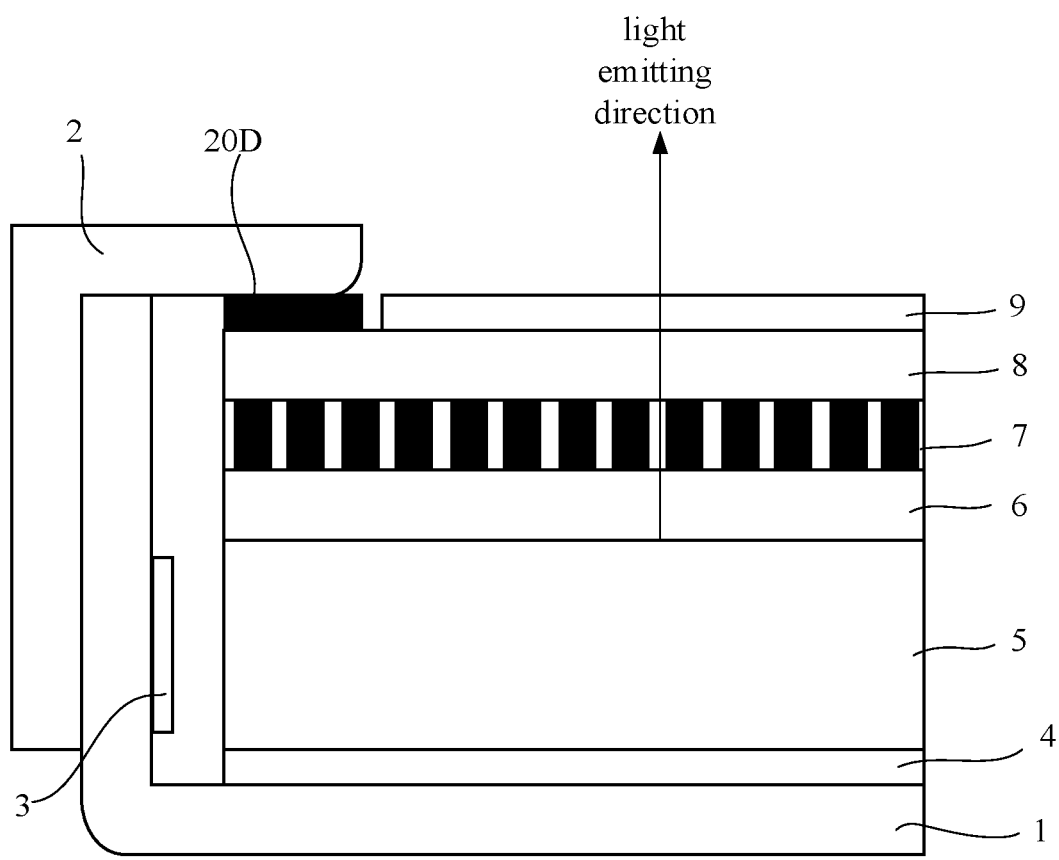
FIG. 9 is a schematic structural diagram of a display device according to embodiments of the present disclosure.

As shown in FIG. 9, the light shielding component may include a fourth light shielding component 20D on the dimming sheet 8. For example, the fourth light shielding component 20D may be a black tape. The fourth light shielding component 20D may be attached to the surface of the dimming sheet 8 close to the plastic frame 2 (that is, the light emitting surface 89, see FIG. 5) and provided at the edge position of the dimming sheet 8. That is, an orthographic projection of the fourth light shielding component 20D on the back plate falls within an orthographic projection of the plastic frame 2 on the back plate. The fourth light shielding component 20D may not only prevent the light emitted from the light transmitting structure 72 at the edge position of the privacy film 7 from exiting through the edge of the plastic frame 2, but may also eliminate a gap between the privacy film and the display panel, which reduces a possibility of the light exiting from the gap. In this way, the above-mentioned side bright stripe phenomenon may at least be alleviated.

After further research by the inventor, it is found that, in addition to light leakage at the end face of the dimming sheet 8, light leakage may occur at end faces of other film materials (for example, the privacy film 7, the diffusion sheet 6, the brightness enhancement film, etc.).

Figure 10:
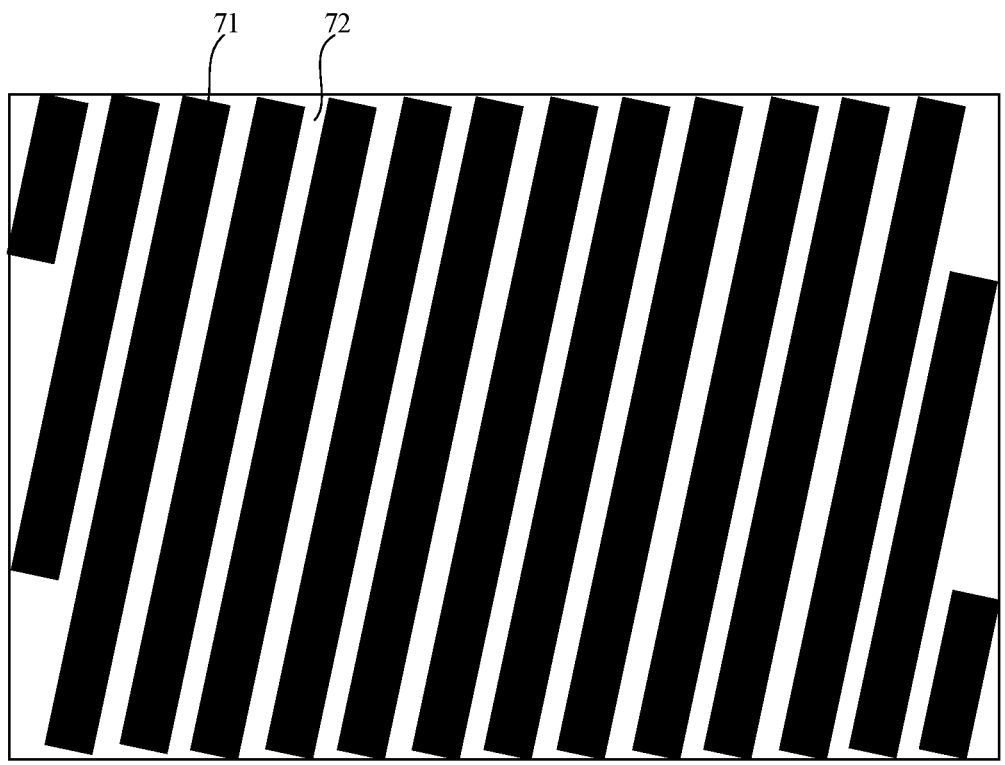
FIG. 10 is a schematic plan view of a privacy film according to embodiments of the present disclosure.

For example, FIG. 10 is a schematic plan view of a privacy film according to the embodiments of the present disclosure. With reference to FIG. 10, the privacy film 7 has a structure similar to a grating. In order to avoid moiré between the privacy film 7 and the display panel 9, the light shielding structure 71 and the light transmitting structure 72 of the privacy film 7 usually rotate at a certain angle relative to the display panel 9, for example, for computer display products, the certain angle is generally 3°-7°. Referring to FIG. 10, there are a plurality of obliquely extended light transmitting structures 72 at the side end face of the privacy film 7. As a result, a part of the light may exit through the plurality of obliquely extended light transmitting structures 72 at the side end face of the privacy film 7 and enter the dimming sheet 8 in the transparent state, thereby aggravating the above-mentioned side bright stripe phenomenon.

Figure 11:
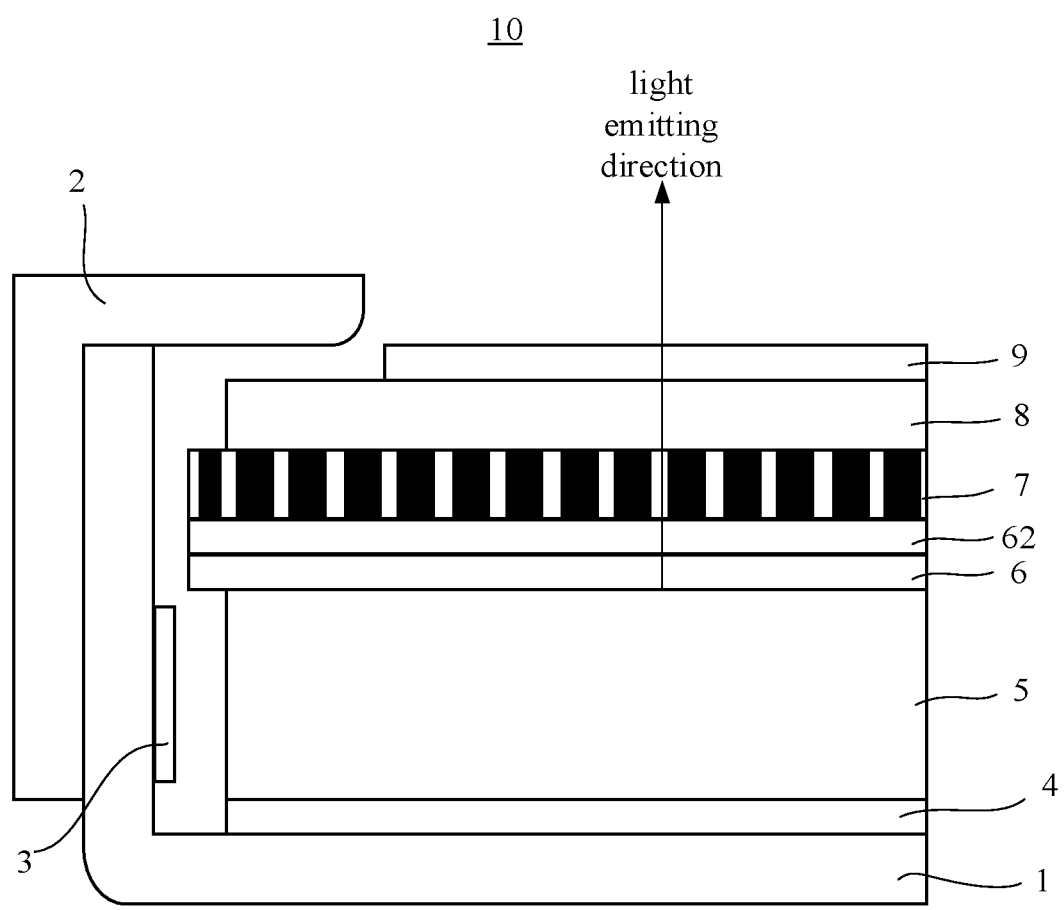
FIG. 11 is a schematic structural diagram of a display device according to embodiments of the present disclosure.

FIG. 11 is a schematic structural diagram of a display device according to the embodiments of the present disclosure. Referring to FIG. 11, the display device 10 may include a back plate 1, a plastic frame 2, a light source 3, a reflective sheet 4, a light guide plate 5, an optical film layer including a diffusion sheet 6, etc., a privacy film 7, a dimming sheet 8, and a display panel 9 and other components. For example, the optical film layer may include a diffusion sheet 6, a brightness enhancement film 62, and the like.

In the illustrated embodiment, a size of the privacy film 7 perpendicular to the light emitting direction (a width of the privacy film 7 shown in FIG. 11) is greater than a size of the dimming sheet 8 perpendicular to the light emitting direction (a width of the dimming sheet 8 shown in FIG. 11). In other words, an orthographic projection of the privacy film 7 on the back plate 1 covers an orthographic projection of the dimming sheet 8 on the back plate 1, and an area of the orthographic projection of the privacy film 7 on the back plate 1 is greater than an area of the orthographic projection of the dimming sheet 8 on the back plate 1.

Optionally, since light leakage may also exist at the side end face of the optical film layer including the diffusion sheet 6, the brightness enhancement film 62, etc. Thus, a size of the optical film layer including the diffusion sheet 6, the brightness enhancement film 62, etc. perpendicular to the light emitting direction (a width of the optical film layer shown in FIG. 11) is greater than a size of the dimming sheet 8 perpendicular to the light emitting direction (a width of the dimming sheet 8 shown in FIG. 11). In other words, an orthographic projection of the optical film layer on the back plate 1 covers an orthographic projection of the dimming sheet 8 on the back plate 1, and an area of the orthographic projection of the optical film layer on the back plate 1 is greater than an area of the orthographic projection of the dimming sheet 8 on the back plate 1.

Through such an arrangement, the light exiting from the side end faces of the privacy film 7 and the optical film layer may be prevented from entering the dimming sheet 8 in the transparent state, thereby at least reducing the above-mentioned side bright stripe phenomenon.

Figure 12:
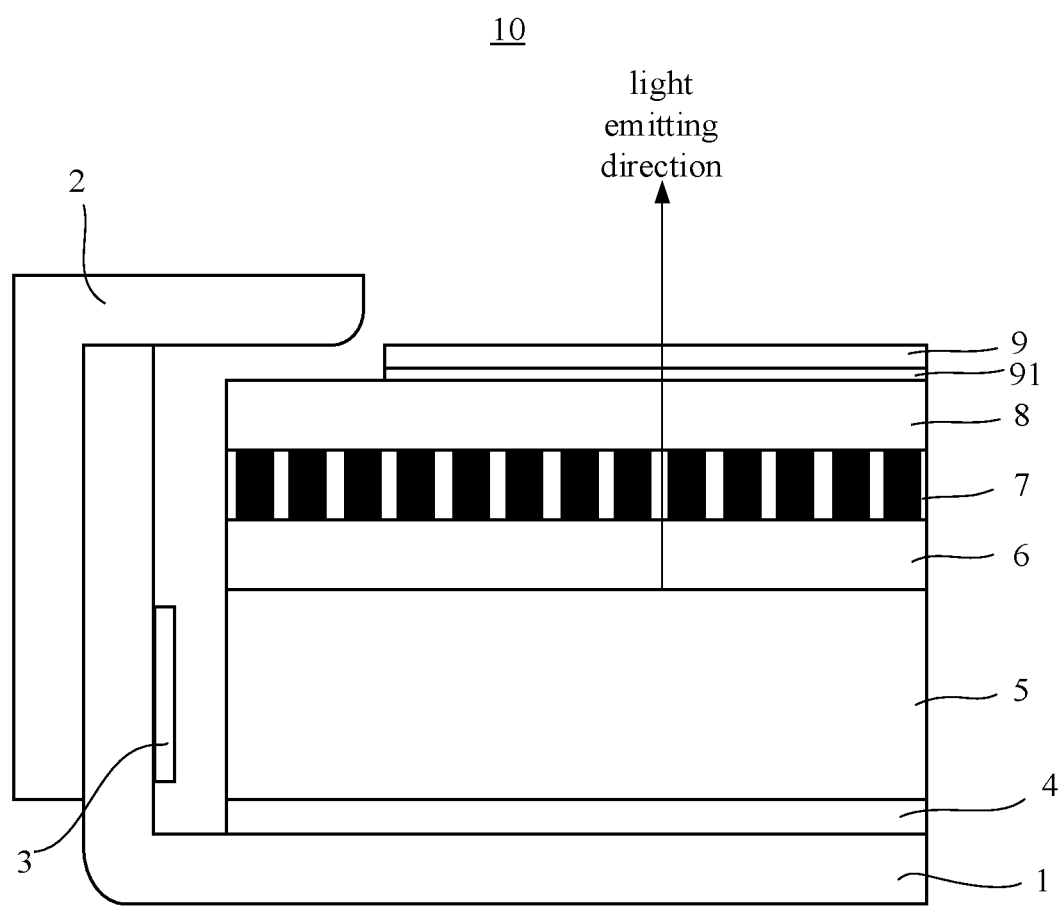
FIG. 12 is a schematic structural diagram of a display device according to embodiments of the present disclosure.

FIG. 12 is a schematic structural diagram of a display device according to the embodiments of the present disclosure. Referring to FIG. 12, the display device 10 may include a back plate 1, a plastic frame 2, a light source 3, a reflective sheet 4, a light guide plate 5, an optical film layer including a diffusion sheet 6, etc., a privacy film 7, a dimming sheet 8, and a display panel 9 and other components. The display device 10 may further include a polarizer 91 disposed on a side of the display panel 9 close to the dimming sheet 8.

Figure 13:
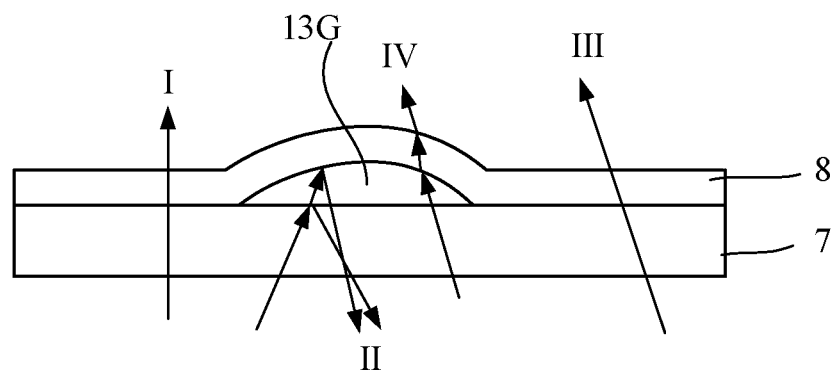
FIG. 13 schematically shows a cause of a rainbow pattern phenomenon of the display device in the related art.

Referring to FIG. 12, the optical film layer, the privacy film 7, the dimming sheet 8 and the polarizer 9 are arranged in sequence along the light emitting direction. The inventor found through research that since each of the optical film layer, the privacy film 7, the dimming sheet 8 and the polarizer 9 has a smooth surface, the two adjacent film layers in the optical film layer, the privacy film 7, the dimming sheet 8 and the polarizer 9 are prone to adsorb. For example, FIG. 13 schematically shows an adsorption phenomenon between the privacy film 7 and the dimming sheet 8. As shown in FIG. 13, since a material of the dimming sheet 8 is relatively soft, a surface deformation will occur after the dimming sheet 8 and the privacy film 7 are adsorbed, thereby forming an air gap 13G of unequal thicknesses between the two. At this time, when the dimming sheet 8 is in the transparent state, light at a small angle that is incident from the privacy film 7 passes through a deformed area of the dimming sheet 8, and a part of the light is reflected by a lower surface of the dimming sheet 8 and an upper surface of the privacy film 7 to form interference stripes; the other part of the light passes through the dimming sheet 8. For example, as shown in FIG. 13, the light I transmits normally without interference; the light II produces interference; the light III transmits normally without interference; and the light IV is refracted by the air gap 13G and then passes through the dimming sheet 8 without interference. As a result, there may be a rainbow pattern phenomenon during display of the display device 10. It should be understood that, an adsorption phenomenon may also occur between the optical film layer (such as the brightness enhancement film) and the privacy film 7 and between the dimming film 8 and the polarizer 9, which may aggravate the rainbow pattern phenomenon described above.

In the embodiments of the present disclosure, the surface of the privacy film 7 is atomized. For example, a surface of the privacy film 7 close to the optical film layer (such as the brightness enhancement film) (a lower surface in FIG. 12) and a surface of the privacy film 7 close to the dimming sheet 8 (an upper surface in FIG. 12) are both atomized rough surfaces, that is, the privacy film 7 is a double-sided anti-glare privacy film.

Figure 14:
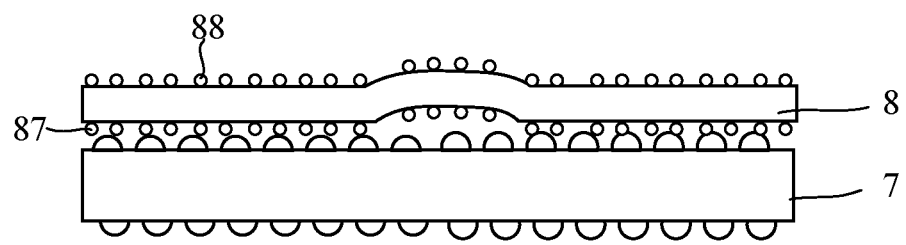
FIG. 14 schematically shows a contact surface between a privacy film and a dimming sheet according to embodiments of the present disclosure.

FIG. 14 schematically shows a contact surface between a privacy film and a dimming sheet according to the embodiments of the present disclosure. Referring to FIGS. 12 and 14 in conjunction, by increasing a surface roughness (or haze) of the privacy film 7, it is possible to reduce or even eliminate the absorption phenomenon between the privacy film 7 and the dimming sheet 8 and between the privacy film 7 and the optical film (such as the brightness enhancement film), thereby reducing or even eliminating interference stripes that may be generated. In this way, the above-mentioned rainbow pattern phenomenon may be reduced and eliminated.

Similarly, a surface of the polarizer 91 may be atomized. For example, the surface of the polarizer 91 close to the dimming sheet 8 (a lower surface in FIG. 12) is a rough surface that has been atomized. Since a haze of the polarizer 91 has an impact on a privacy effect, it has been verified through a plurality of experiments that when the haze of the polarizer 91 is adjusted to a haze of about 1%, the above-mentioned rainbow pattern phenomenon may be effectively reduced, and a privacy viewing angle may meet user's requirements (for example, the viewing angle being within ±45°).

Optionally, in order to reduce or even eliminate the adsorption phenomenon between the dimming sheet 8 and the privacy film 7 and between the dimming sheet 8 and the polarizer 91, anti-absorption particles may be applied on the surface of the dimming sheet 8. Referring to FIG. 14, the dimming sheet 8 further includes anti-absorption particles 87 on the surface of the dimming sheet 8 close to the privacy film 7 and anti-absorption particles 88 on the surface of the dimming sheet 8 close to the polarizer 91. By providing such anti-adsorption particles, both the surface of the dimming sheet 8 close to the privacy film 7 and the surface of the dimming sheet 8 close to the polarizer 91 are formed as rough surfaces.

For example, a material of the anti-adsorption particles may include any one of silicone, polystyrene, polycarbonate, and calcium carbonate. Of course, the anti-adsorption particles may also be made of other materials commonly used in related fields. The embodiments of the present disclosure do not specifically limit it.

It should be noted that in this context, in order to clearly describe the embodiments of the present disclosure, various structures of the display device provided by the embodiments of the present disclosure are respectively described in conjunction with FIGS. 3 to 12, and those skilled in the art should understand that, in the case of no conflict, the various structures of the display device provided by the embodiments of the present disclosure described in conjunction with FIGS. 3 to 12 may be combined freely. For example, the structure shown in FIG. 3 may be combined with any one, multiple or all combinations of the structures shown in FIG. 5, FIG. 6, FIG. 7, FIG. 9, FIG. 11, and FIG. 12. The structure shown in FIG. 5 may be combined with any one, multiple, or all combinations of the structures shown in FIG. 7, FIG. 9, FIG. 11, and FIG. 12. It should be understood that, the various embodiments that are freely combined without conflict also fall within the scope of the present disclosure.

In the following, the structure of the dimming sheet and a connection structure between the dimming sheet and a flexible circuit board according to the embodiments of the present disclosure will be described in detail with reference to the accompanying drawings.

Figure 15:
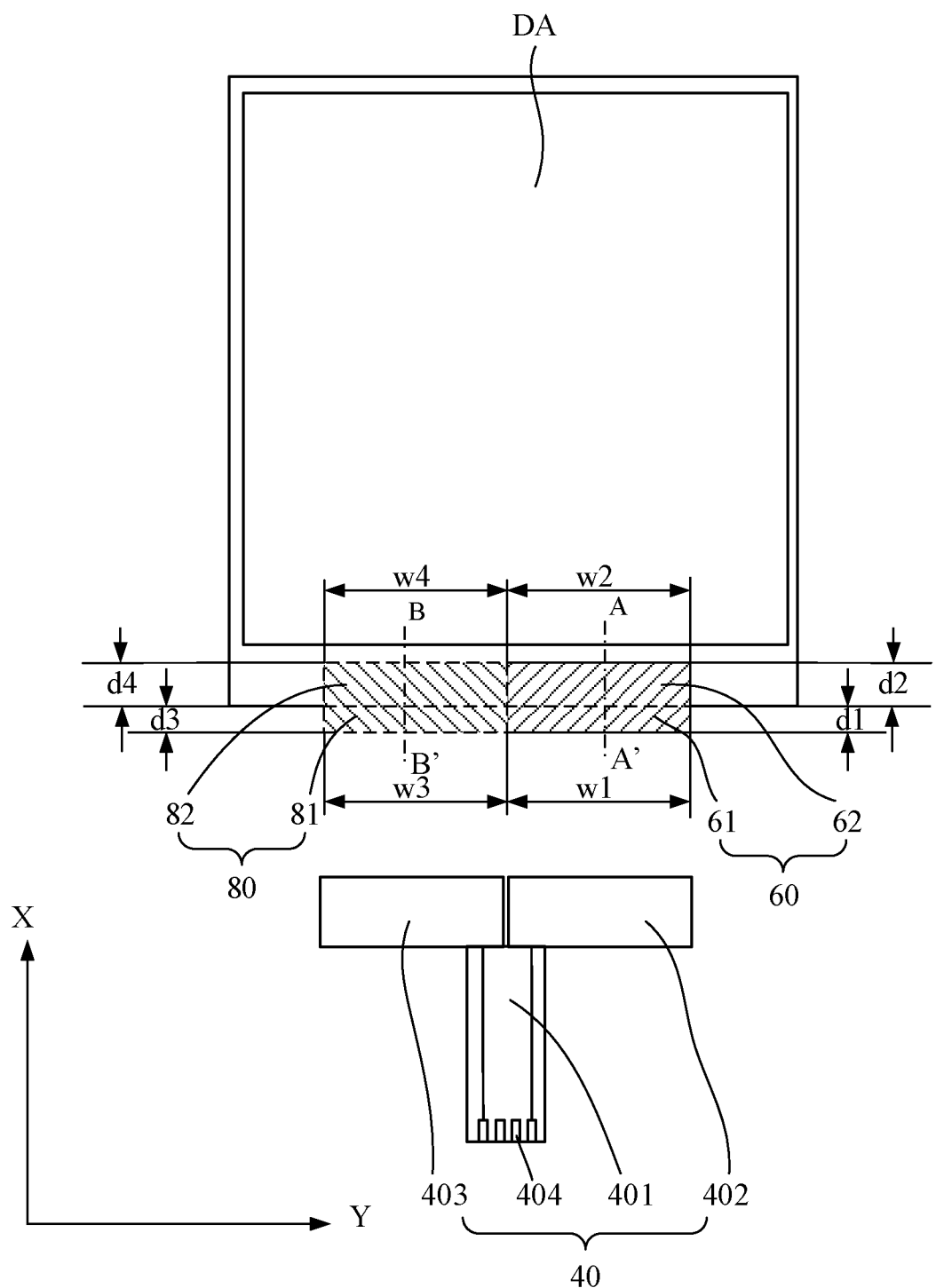
FIG. 15 is a schematic plan view of a dimming sheet according to embodiments of the present disclosure.
Figure 16:
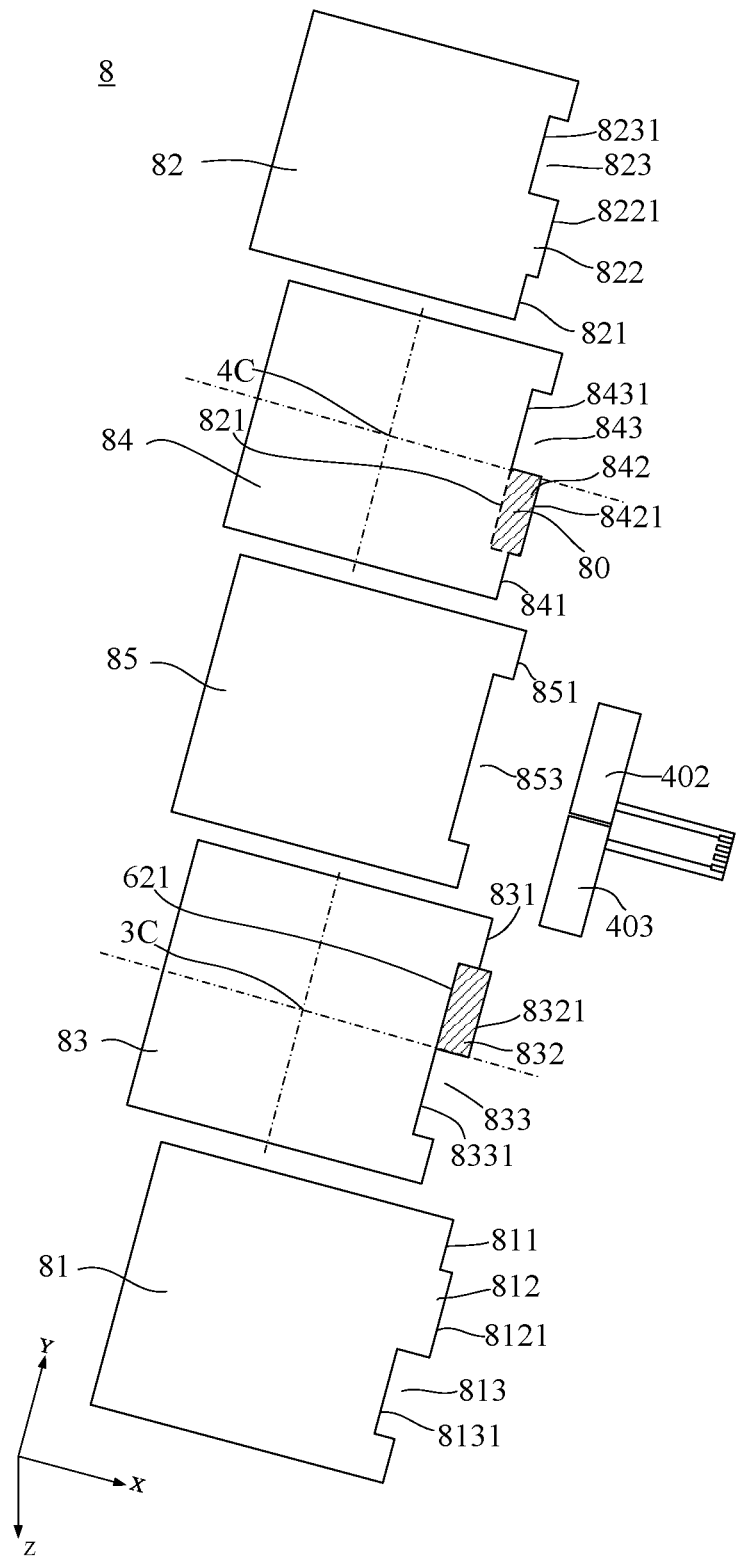
FIG. 16 is an exploded view of a dimming sheet according to embodiments of the present disclosure.
Figure 17:
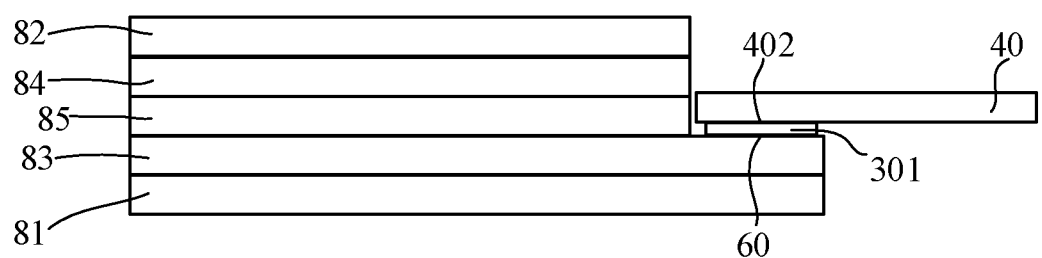
FIG. 17 is a cross-sectional view of the dimming sheet according to the embodiments of the present disclosure taken along line AA' in FIG. 15.
Figure 18:
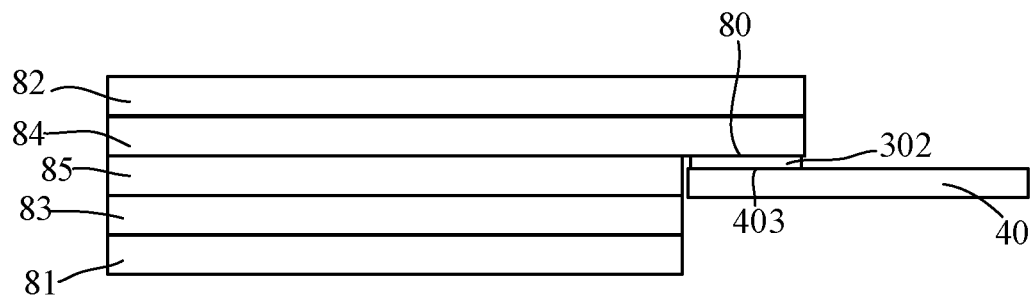
FIG. 18 is a cross-sectional view of the dimming sheet according to the embodiments of the present disclosure taken along line BB' in FIG. 15.

FIG. 15 is a schematic plan view of a dimming sheet according to the embodiments of the present disclosure, FIG. 16 is an exploded view of the dimming sheet according to the embodiments of the present disclosure, FIG. 17 is a cross-sectional view of the dimming sheet according to the embodiments of the present disclosure taken along line AA of FIG. 15, and FIG. 18 is a cross-sectional view of the dimming sheet according to the embodiments of the present disclosure taken along line BB' in FIG. 15.

Referring to FIGS. 15-18 in conjunction, the dimming sheet 8 may include: a first substrate 81 and a second substrate 82 disposed oppositely; a first conductive layer 83 on a side of the first substrate 81 close to the second substrate 82; a second conductive layer 84 on a side of the second substrate 82 close to the first substrate 81; and a dimming function layer 85 between the first conductive layer 83 and the second conductive layer 84.

As described above, the dimming function layer 85 may be a PDLC layer, a PNLC layer or a PSLC layer. It should be understood that the dimming function layer 85 is not limited to the above examples, it may be any function layer with electric control light switching characteristics under an action of an electric field. For example, under an action of an electric field, the dimming function layer 85 may be in a transparent state, and an the action of no electric field, the dimming function layer 85 may be in a mist state.

Referring to FIG. 15, the dimming sheet 8 further includes a first electrode 60 electrically connected to the first conductive layer 83 and a second electrode 80 electrically connected to the second conductive layer 84. For example, the first electrode 60 may be one of a positive electrode and a negative electrode, and the second electrode 80 may be the other one of the positive electrode and the negative electrode. Through the first electrode 60 and the second electrode 80, designated electrical signals may be applied to the first conductive layer 83 and the second conductive layer 84, respectively.

Referring to FIGS. 16 and 17 in combination, the first electrode 60 may be located on a surface of the first conductive layer 83 close to the dimming function layer 85. For example, a part of the surface of the first conductive layer 83 close to the dimming function layer 85 may be formed as the first electrode 60.

In this embodiment, a part of the first conductive layer 83 is formed as the first electrode 60. It should be understood that the embodiments of the present disclosure are not limited to this, and a separate conductive portion may also be provided on the first conductive layer 83, for example, a conductive material such as metal may deposited on the first conductive layer 83 to constitute the first electrode.

Referring to FIGS. 16 and 17 in conjunction, the first electrode 60 is located on one side of the first conductive layer 83. For ease of description, the side of the first conductive layer 83 is referred to as a first side of the first conductive layer 83. The first conductive layer 83 includes a first side face 831, and the first side face 831 is located on the side where the first electrode 60 is located (ie, the first side). The first conductive layer 83 includes a protruding portion 832 protruded with respect to the first side face 831 and a notch portion 833 recessed with respect to the first side face 831. The protruding portion 832 includes a second side face 8321, and the second side face 8321 is protruded outward relative to the first side face 831, that is, farther away from a center 3C of the first conductive layer 83. The notch portion 833 includes a fourth side face 8331, and the fourth side face 8331 is recessed inward relative to the first side face 831, that is, closer to the center 3C of the first conductive layer 83.

Referring to FIGS. 15 to 17 in conjunction, the first electrode 60 includes a first electrode part 61 and a second electrode part 62. The first electrode part 61 and the second electrode part 62 are respectively located on opposite sides of the first side face 831. For example, the protrusion 832 of the first conductive layer 83 is formed as the first electrode part 61, and a part of the first conductive layer 83 adjacent to the protrusion 832 in a direction perpendicular to the first side face 831 (the X direction in FIG. 1) is formed as the second electrode part 62. That is to say, the first electrode part 61 and the second electrode part 62 are respectively located on both sides of the first side face 831 in the direction perpendicular to the first side face 831. Through such design, the first electrode 60 has a semi-embedded structure.

As shown in FIGS. 15-16, the second side face 8321 is formed as an outer side face of the first electrode part 61. Also, the second electrode part 62 has a third side face 621 in a direction perpendicular to the first side face 831. The third side face 621 is flush with the fourth side face 8331 of the notch portion 833 in a direction perpendicular to the first side face 831.

Similarly, referring to FIGS. 16 and 18 in conjunction, the second electrode 80 may be located on a surface of the second conductive layer 84 close to the dimming function layer 85. For example, a part of the surface of the second conductive layer 84 close to the dimming function layer 85 may be formed as the second electrode 80.

In this embodiment, a part of the second conductive layer 84 is formed as the second electrode 80. It should be understood that the embodiments of the present disclosure are not limited to this, and a separate conductive portion may also be provided on the second conductive layer 84, for example, a conductive material such as metal may be deposited on the second conductive layer 84 to constitute the second electrode.

It should be noted that in the illustrated embodiment, the first electrode 60 and the second electrode 80 are respectively provided on the upper surface of the first conductive layer 83 and the lower surface of the second conductive layer 84, so, in a plan view, the second electrode 80 should be invisible. However, in the plan view of the drawings, in order to clearly show the structure of the second electrode 80, the second electrode 80 is still shown and represented by a dashed box.

Referring to FIGS. 15 and 16 in conjunction, the second electrode 80 is located on one side of the second conductive layer 84. For ease of description, the side of the second conductive layer 84 is referred to as a first side of the second conductive layer 84. The second conductive layer 84 includes a first side face 841, and the first side face 841 is located on the side where the second electrode 80 is located (ie, the first side). The second conductive layer 84 includes a protrusion 842 protruded with respect to the first side face 841 and a notch portion 843 recessed with respect to the first side face 841. The protrusion 842 includes a second side face 8421, and the second side face 8421 is protruded outward relative to the first side face 841, that is, farther away from a center 4C of the second conductive layer 84. The notch portion 843 includes a fourth side face 8431, and the fourth side face 8431 is recessed inward with respect to the first side face 841, that is, closer to the center 4C of the second conductive layer 84.

The second electrode 80 includes a third electrode part 81 and a fourth electrode part 82. The third electrode part 81 and the fourth electrode part 82 are located on opposite sides of the first side face 841, respectively. For example, the protrusion 842 of the second conductive layer 84 is formed as the third electrode part 81, and a part of the second conductive layer 84 adjacent to the protrusion 842 in a direction perpendicular to the first side face 841 is formed as the fourth electrode part 82. That is, the third electrode part 81 and the fourth electrode part 82 are respectively located on both sides of the first side face 841 in the direction perpendicular to the first side face 841. Through such design, the second electrode 80 has a semi-embedded structure.

As shown in FIGS. 15-16, the second side face 8421 is formed as an outer side face of the third electrode part 81. Also, the fourth electrode part 82 has a third side face 821 in the direction perpendicular to the first side face 841. The third side face 821 is flush with the fourth side face 8431 of the notch portion 843 in a direction perpendicular to the first side face 841.

In the embodiments of the present disclosure, the first electrode 60 and the second electrode 80 are respectively bonded to a circuit board such as a flexible circuit board (referred to as FPC for short) (which will be described in detail below) to realize an electrical connection between the electrode and the circuit board. When the circuit board is subjected to an external force, stress will be generated in the above-mentioned dimming sheet. In the embodiments of the present disclosure, by designing the first electrode 60 and the second electrode 80 into semi-embedded structures, the stress generated in the dimming sheet may be reduced, and a binding force between the dimming sheet and the flexible circuit board may be increased. For example, with respect to the convex electrode structure in which the electrodes are completely protruded from the first side face, in response to other structure, size and external force of the dimming sheet being completely the same, it is found through mechanical simulation tests that the stress generated in the dimming sheet may be reduced from 216.9 MPa in the convex electrode structure to 170 MPa in the semi-embedded electrode structure. By reducing the stress generated in the dimming sheet, a separation between the layers in the dimming sheet caused by large stress may be avoided, thereby ensuring that the dimming sheet may function normally. In addition, in the embodiments of the present disclosure, by designing the first electrode 60 and the second electrode 80 into semi-embedded structures, distances between inner side faces of the first electrode 60 and the second electrode 80 and a display area (indicated by DA as shown in FIG. 15) are relatively small, which may avoid light leakage when viewing at a large viewing angle.

It should be understood that, in this context, the first side face of the dimming sheet may be a side face of the dimming sheet 8 close to the flexible circuit board. For example, it may be represented by the aforementioned first side face 831 or the first side face 841.

For example, an area of an orthographic projection of the first electrode part 61 on the first substrate 81 may be equal to an area of an orthographic projection of the second electrode part 62 on the first substrate 81. That is, half of the first electrode 60 is protruded with respect to the first side face 831, and the other half is not protruded with respect to the first side face 831. Similarly, an area of an orthographic projection of the third electrode part 81 on the second substrate 82 may be equal to an area of an orthographic projection of the fourth electrode part 82 on the second substrate 82. That is, half of the second electrode 80 is protruded with respect to the first side face 841, and the other half is not protruded with respect to the first side face 841.

Figure 19:
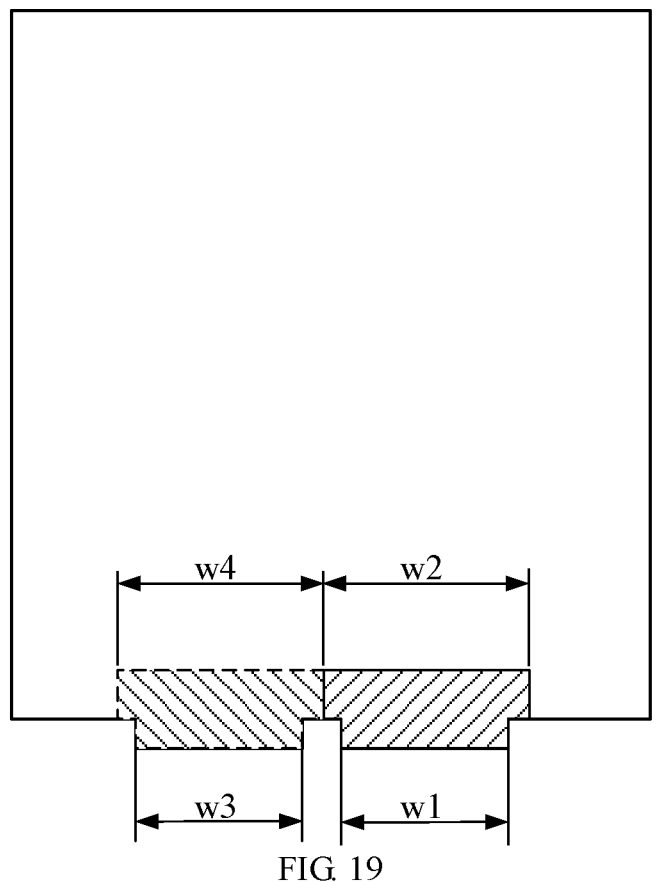
FIG. 19 is a schematic plan view of a dimming sheet according to other embodiments of the present disclosure.

For another example, the area of the orthographic projection of the first electrode part 61 on the first substrate 81 may be smaller than the area of the orthographic projection of the second electrode part 62 on the first substrate 81. For example, a width of the first electrode part 61 in the direction perpendicular to the first side face 831 may be smaller than or equal to a width of the second electrode part 62 in the direction perpendicular to the first side face 831. Specifically, as shown in FIG. 15, a distance between the second side face 8321 and the first side face 831 in the X direction is d1, a distance between the first side face 831 and the third side face 621 in the X direction is d2, and a length of the second side face 8321 in the X direction is w1, and a length of the third side face 621 in the Y direction is w2. In some exemplary embodiments, w1=w2, d1<d2. For example, a ratio of d1 to d2 may be in a range of ⅔ to ⅘. In one example, d1=1 mm and d2=1.5 mm. Through such a design, the area of the orthographic projection of the first electrode part 61 on the first substrate 81 may be smaller than the area of the orthographic projection of the second electrode part 62 on the first substrate 81. In other exemplary embodiments, as shown in FIG. 19, w1<w2, in this case, d1 may be greater than, equal to, or less than d2, as long as the area of the orthographic projection of the first electrode part 61 on the first substrate 81 being smaller than the area of the orthographic projection of the second electrode part 62 on the first substrate 81 is realized.

Similarly, an area of an orthographic projection of the third electrode part 81 on the second substrate 82 may be smaller than an area of an orthographic projection of the fourth electrode part 82 on the second substrate 82. For example, a width of the third electrode part 81 in the direction perpendicular to the first side face 841 may be smaller than or equal to a width of the fourth electrode part 82 in the direction perpendicular to the first side face 841. Specifically, as shown in FIG. 15, a distance between the second side face 8421 and the first side face 841 in the X direction is d3, a distance between the first side face 841 and the third side face 821 in the X direction is d4, a length of the second side face 8421 in the Y direction is w3, and a length of the third side face 821 in the Y direction is w4. In some exemplary embodiments, w3=w4, d3<d4; or w3<w4, d3<d4. For example, a ratio of d3 to d4 may be in a range of ⅔ to ⅘. In one example, d3=1 mm, d4=1.5 mm. Through such a design, the area of the orthographic projection of the third electrode part 81 on the second substrate 82 may be smaller than the area of the orthographic projection of the fourth electrode part 82 on the second substrate 82. In other exemplary embodiments, as shown in FIG. 19, w3<w4, in this case, d3 may be greater than, equal to, or less than d4, as long as the area of the orthographic projection of the third electrode part 81 on the second substrate 82 being smaller than the area of the orthographic projection of the fourth electrode part 82 on the second substrate 82 is realized.

In the above embodiment, by making the area of the electrode part protruded with respect to the first side face relatively small, the stress generated in the dimming sheet may be further reduced, thereby further increasing the binding force between the dimming sheet and the flexible circuit board.

Referring to FIGS. 15 and 16, the orthographic projection of the first electrode 60 on the first substrate 81 may have a rectangular shape. For example, orthographic projections of the first electrode part 61 and the second electrode part 62 of the first electrode 60 on the first substrate 81 may both have a rectangular shape. A width of the first electrode 60 is a distance between the second side face 8321 and the third side face 621 in the X direction, that is, the width of the first electrode 60 is equal to d1+d2. A length of the first electrode 60 is the larger one of the length w1 of the second side face 8321 in the Y direction and the length w2 of the third side face 621 in the Y direction. Similarly, the orthographic projection of the second electrode 80 on the second substrate 82 may have a rectangular shape. For example, orthographic projections of the third electrode part 81 and the fourth electrode part 82 of the second electrode 80 on the second substrate 82 may both have a rectangular shape. A width of the second electrode 80 is a distance between the second side 8421 and the third side 821 in the X direction, that is, the width of the second electrode 80 is equal to d3+d4. A length of the second electrode 80 is the larger one of the length w3 of the second side face 8421 in the Y direction and the length w4 of the third side face 821 in the Y direction.

In the embodiments of the present disclosure, widths of each of the first electrode 60 and the second electrode 80 may be equal to or less than 2.5 mm. By designing the widths of the first electrode 60 and the second electrode 80 relatively small, it is advantageous to realize a display device with a narrow frame.

The inventor found through research that a conductive area of the electrode (for example, the conductive area may be equal to the length of the electrode multiplied by the width) determines a surface temperature, a resistance, and a capacitance of the electrode. As the conductive area increases, the surface temperature of the electrode decreases, the resistance value and the capacitance value decreases as well. The following table is a performance table of the electrode of the dimming sheet according to the embodiments of the present disclosure under different parameter designs. Therefore, in the embodiments of the present disclosure, the length of the first electrode 60 may be designed to be 3-10 times of its width, and similarly, the length of the second electrode 80 may be designed to be 3-10 times of its width.

TABLE 1 performance of the electrode of the dimming sheet under different parameter designs

| length of an electrode (mm) | Width of an electrode (mm) | Area of an electrode (mm$^2$) | resistance (KΩ) | capacitance (PF) | Surface temperature of an electrode (° C.) |
| --- | --- | --- | --- | --- | --- |
| 10.5 | 2.5 | 26.25 | 38.9 | 19.89 | 37 |
| 14.75 | 2.5 | 36.875 | 38 | 19.84 | 36 |
| 18.5 | 2.5 | 46.25 | 36.8 | 19.83 | 36 |
| 22.5 | 2.5 | 56.25 | 36.8 | 19.83 | 36 |

Through such a design, while meeting the requirements of the narrow frame of the display device, a better driving voltage of the dimming sheet may be obtained, and the surface temperature, resistance or capacitance of the electrode have reasonable values during operation.

Referring back to FIG. 16, outer contours of the first substrate 81 and the first conductive layer 83 may be the same, that is, the projections of the first substrate 81 and the first conductive layer 83 in the Z direction may overlap. Specifically, the first substrate 81 includes a first side face 811, which further includes a protrusion 812 protruded relative to the first side face 811 and a notch portion 813 recessed relative to the first side face 811. The protrusion 812 includes a second side face 8121, the second side face 8121 is protruded outward relative to the first side face 811. The notch portion 813 includes a fourth side face 8131, and the fourth side face 8131 is recessed inward with respect to the first side face 811.

Similarly, outer contours of the second substrate 82 and the second conductive layer 84 may be the same, that is, the projections of the second substrate 82 and the second conductive layer 84 in the Z direction may overlap. Specifically, the second substrate 82 includes a first side face 821, which further includes a protrusion 822 protruded relative to the first side face 821 and a notch portion 823 recessed relative to the first side face 821. The protrusion 822 includes a second side face 8221, and the second side face 8221 is protruded outward relative to the first side face 821. The notch portion 823 includes a fourth side face 8231, and the fourth side face 8231 is recessed inward with respect to the first side face 821.

The dimming function layer 85 includes a first side face 851, which further includes a notch portion 853 recessed relative to the first side face 851.

In the embodiments of the present disclosure, projections of the protrusion 812 of the first substrate 81 and the protrusion 832 of the first conductive layer 83 in the Z direction overlap, and projections of the notch portion 823 of the second substrate 82 and the notch portion 843 of the second conductive layer 84 in the Z direction overlap. More specifically, the projections of the notch portion 823 of the second substrate 82 and the notch portion 843 of the second conductive layer 84 in the Z direction overlap with the projection of the first electrode 60 in the Z direction, and the projection of the notch portion of the dimming function layer 85 in the Z direction covers the projection of the first electrode 60 in the Z direction. In this way, the notch portion 823 of the second substrate 82, the notch portion 843 of the second conductive layer 84, and a notch portion 853 of the dimming function layer 85 expose an upper surface of the first conductive layer 83, so that the first electrode 60 on the upper surface of the layer 83 is exposed, which facilitates the electrical connection between the first electrode 60 and the circuit board.

In the embodiments of the present disclosure, projections of the protrusion 822 of the second substrate 82 and the protrusion 842 of the second conductive layer 84 in the Z direction overlap, and projections of the notch portion 813 of the first substrate 81 and the notch portion 833 of the first conductive layer 83 overlap. More specifically, the projection of the notch portion 813 of the first substrate 81 and the notch portion 833 of the first conductive layer 83 in the Z direction overlap with the projection of the second electrode 80 in the Z direction, and the projection of the notch portion 853 of the dimming function layer 85 in the Z direction covers the projection of the second electrode 80 in the Z direction. In this way, the notch portion 813 of the first substrate 81, the notch portion 833 of the first conductive layer 83, and the notch portion 853 of the dimming function layer 85 expose a part of the lower surface of the second conductive layer 84, so that the second electrode 80 on the lower surface of the second conductive layer 84 is exposed, which facilitates the electrical connection between the first electrode 8 and the circuit board.

For example, a distance between the orthographic projections of the first electrode 60 on the first substrate 81 and the orthographic projection of the second electrode 80 on the first substrate 81 is relatively small. In the embodiment shown in FIGS. 15-16, the distance between the orthographic projection of the first electrode 60 on the first substrate 81 and the orthographic projection of the second electrode 80 on the first substrate 81 is substantially equal to zero, that is, a side face of the first electrode 60 whose orthographic projection on the first substrate 81 that is close to the orthographic projection of the second electrode 80 on the first substrate 81 completely overlaps with a side face of the second electrode 80 whose orthographic projection on the first substrate 81 that is close to the orthographic projection of the first electrode 60 on the first substrate 81, as shown in FIG. 19.

In this case, optionally, the projection of the notch portion 853 of the dimming function layer 85 in the Z direction overlaps with the projection of a combination of the first electrode 60 and the second electrode 80 in the Z direction. In this way, as shown in FIG. 16, a larger notch portion 853 may be formed in the dimming function layer 85, which is beneficial to simplify the manufacturing process.

For example, the first substrate 81 and the second substrate 82 may both be transparent PET (polyethylene terephthalate) substrates, glass substrates, or PC (polycarbonate) substrates.

For example, a material of the first conductive layer 83 and the second conductive layer 84 is ITO (transparent indium tin oxide film) or PCF (polymer flexible transparent conductive film).

It should be noted that although in the above-mentioned embodiments, each of the first conductive layer 83 and the second conductive layer 84 includes a planar electrode, however, it should be understood that the embodiments of the present disclosure are not limited thereto. Each of the first conductive layer 83 and the second conductive layer 84 may include a grid-shaped electrode for use in an HDR display product, thereby improving a contrast of the display device; alternatively, each of the first conductive layer 83 and the second conductive layer 84 may include a annular electrode or a strip electrode.

Referring further to FIGS. 15-18, which schematically show the electrical connection between the dimming sheet according to the embodiments of the present disclosure and the circuit board such as FPC. In this context, the dimming sheet, the circuit board such as FPC, and the connection structure between the two are referred to as the dimming sheet assembly.

Referring to FIGS. 15-18 in conjunction, the dimming sheet assembly according to the embodiments of the present disclosure may include the aforementioned dimming sheet, a flexible circuit board 40, and a conductive connection layer between the dimming sheet and the flexible circuit board 40.

The flexible circuit board 40 may include a flexible circuit board body 401, a first contact portion 402, a second contact portion 403 and a third contact portion 404. The first contact portion 402 is located on a first surface of the flexible circuit board body 401, and the second contact portion 403 is located on a second surface of the flexible circuit board body 401. The first surface and the second surface are two opposite surfaces of the flexible circuit board body 401. For example, the first surface is a surface of the flexible circuit board body 401 facing the first conductive layer 83, and the second surface is a surface of the flexible circuit board body 401 facing the second conductive layer 84. The first contact portion 402 is conductively connected to the first electrode 60, and the second contact portion 403 is conductively connected to the second electrode 80. The third contact portion 404 is, for example, a golden finger portion for conductive connection with an external circuit (such as an integrated chip).

Referring to FIGS. 15, 17 and 18 in conjunction, the conductive connection layer includes a first conductive adhesive layer 301 and a second conductive adhesive layer 302, for example, the first conductive adhesive layer 301 and the second conductive adhesive layer 302 may be Anisotropic Conductive Films (ACF for short).

For example, the first contact portion 402 and the second contact portion 403 of the flexible circuit board 40 may be copper foil leads on the flexible circuit board body 401. During the assembly process, the first electrode 60 and the second electrode 80 of the dimming sheet are respectively aligned with the first contact portion 402 and the second contact portion 403 of the flexible circuit board 40, and the ACF material is put between the first electrode 60 and the first contact portion 402 and between the second electrode 80 and the second contact portion 403, and then bonded by thermo-compression bonding. Through such a connection method, not only the electrical connection structure between the dimming sheet and the circuit board is simplified, but also a reliability of the electrical connection between the two is ensured.

Figure 20:
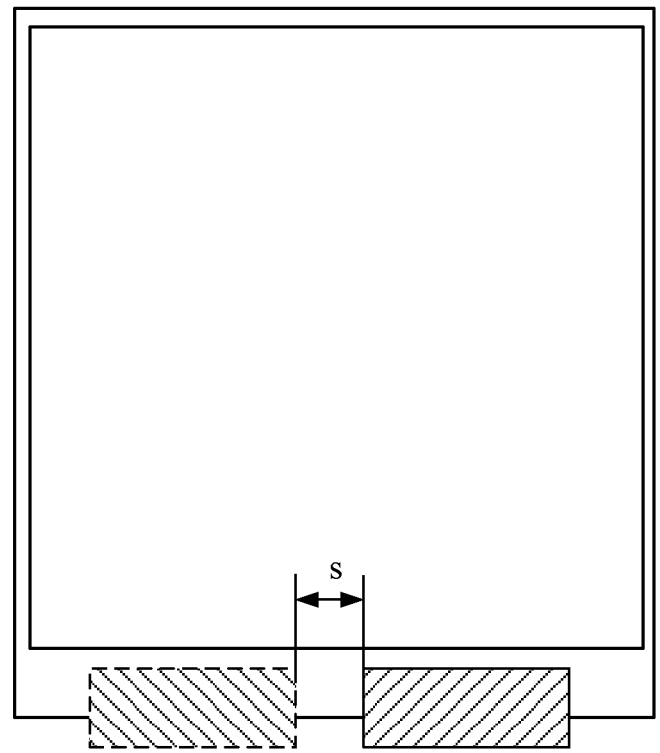
FIG. 20 is a schematic plan view of a dimming sheet according to still other embodiments of the present disclosure.
Figure 20:
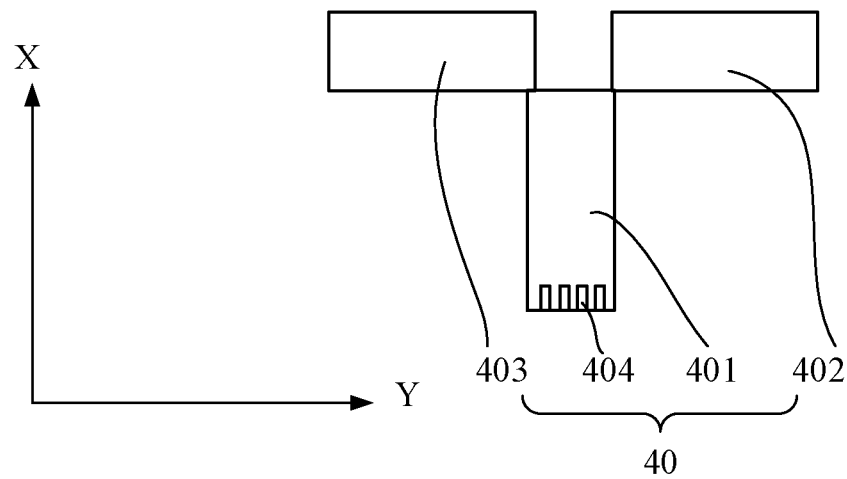
Figure 21:
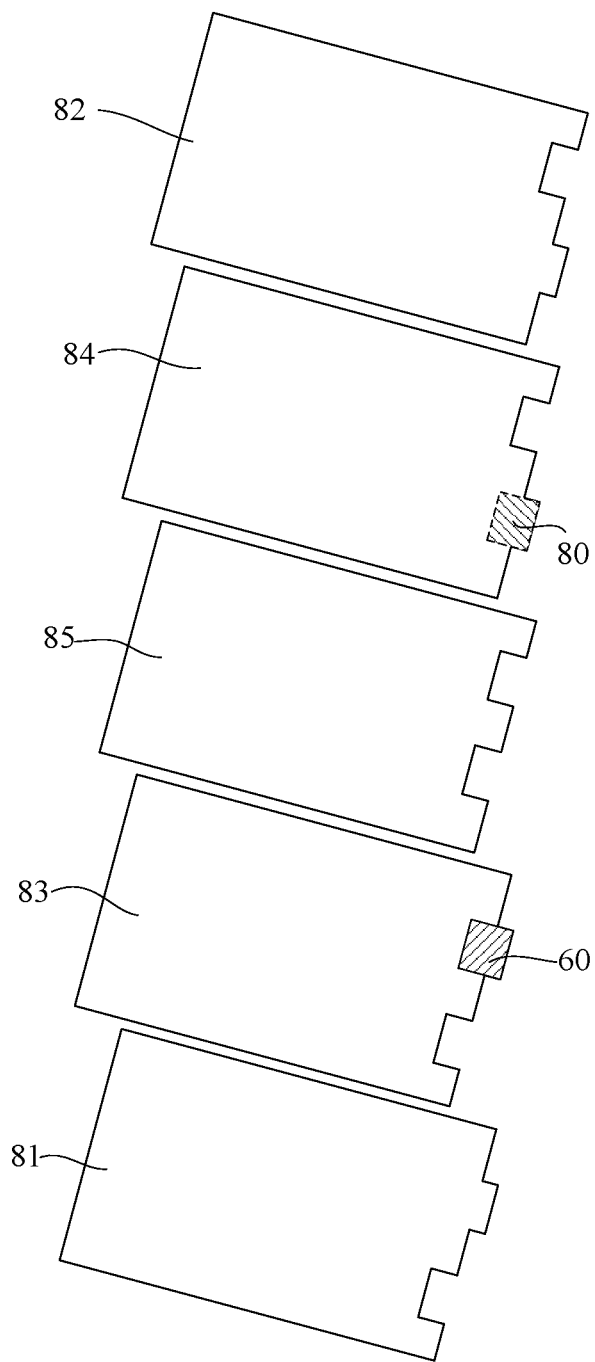
FIG. 21 is an exploded view of a dimming sheet according to yet other embodiments of the present disclosure.

FIG. 20 is a schematic plan view of the dimming sheet according to some other embodiments of the present disclosure, and FIG. 21 is an exploded view of the dimming sheet according to some other embodiments of the present disclosure. The following will focus on differences between the embodiments shown in FIGS. 20-21 relative to the embodiment shown in FIGS. 15-19. Other structures of the dimming sheet and the dimming sheet assembly according to the embodiments shown in FIGS. 20-21 may refer to to the description of the embodiments in FIGS. 15-19, and will not be repeated here.

Referring to FIGS. 20 and 21, the dimming sheet 8 includes: a first substrate 81 and a second substrate 82 disposed oppositely; a first conductive layer 83 on a side of the first substrate 81 close to the second substrate 82; a second conductive layer 84 on a side of the substrate 82 close to the first substrate 81; and a dimming function layer 85 between the first conductive layer 83 and the second conductive layer 84. The dimming sheet 8 further includes a first electrode 60 electrically connected to the first conductive layer 83 and a second electrode 80 electrically connected to the second conductive layer 84. Similarly, the first electrode 60 and the second electrode 80 also have semi-embedded structures.

In the illustrated embodiment, an orthographic projection of the first electrode 60 on the first substrate 81 and an orthographic projection of the second electrode 80 on the first substrate 81 are separated by a predefined distance, that is, a distance (distance s in FIG. 20) between a side face of the first electrode 60 whose orthographic projection on the first substrate 81 that is close to an orthographic projection of the second electrode 80 on the first substrate 81 and a side face of the second electrode 80 whose orthographic projection on the first substrate 81 that is close to an orthographic projection of the first electrode 60 on the first substrate 81 is greater than the predefined distance. In the embodiments of the present disclosure, the first electrode 60 is in electrical contact with the first contact portion 402, and the second electrode 80 is in electrical contact with the second contact portion 403. During operation, a certain amount of heat will be accumulated at these two electrical contact positions. By arranging the first electrode 60 and the second electrode 80 at intervals, specifically, at a predefined distance, it is possible to prevent the heat accumulated at the two electrodes from influencing each other (for example, superimposing each other), thereby preventing the electrical connection performance from being affected.

That is to say, in the embodiments of the present disclosure, the predefined distance is related to the heat accumulated at the first electrode 60 and the second electrode 80.

For example, in a display product such as a computer display, the predefined distance may be 40 mm or more. That is, a distance (distance s in FIG. 20) between a side face of the first electrode 60 whose orthographic projection on the first substrate 81 that is close to an orthographic projection of the second electrode 80 on the first substrate 81 and a side face of the second electrode 80 whose orthographic projection on the first substrate 81 that is close to an orthographic projection of the first electrode 60 on the first substrate 81 is greater than 40 mm.

In the embodiment shown in FIGS. 20-21, the dimming sheet assembly may include one flexible circuit board 40. As shown in FIG. 20, the first contact portion 402 and the second contact portion 403 of the flexible circuit board 40 are also separated by the predefined distance to facilitate the alignment with the first electrode 60 and the second electrode 80, respectively.

Optionally, the dimming sheet assembly may include 2 flexible circuit boards. For example, the two flexible circuit boards are a first flexible circuit board and a second flexible circuit board, respectively. The first flexible circuit board may include a first contact portion 402 to be electrically connected with the first electrode 60. The second flexible circuit board may include a second contact portion 403 to be electrically connected with the second electrode 80.

In the display device according to the embodiments of the present disclosure, the first electrode 60 and the second electrode 80 of the dimming sheet 8 are respectively supplied with designated electrical signals through the flexible circuit board 40, so as to form an electric field between the first conductive layer 83 and the second conductive layer. For example, when the dimming function layer 85 is a PDLC layer, the applied electric field may adjust the optical axis orientation of the small droplets composed of liquid crystal molecules. When the refractive index of the small droplets composed of liquid crystal molecules matches the refractive index of the substrate, the PDLC layer may present a transparent state. In this state, the light emitted from the light source of the backlight module may pass through the dimming function layer 85. In this way, through the cooperation of the privacy film 205 and the dimming function layer 85 in the transparent state, the display device is in the privacy mode. When the supply of specified electrical signals to the first electrode 60 and the second electrode 80 is stopped, no electric field is formed between the first conductive layer 83 and the second conductive layer 84, and the optical axis of the small droplet composed of liquid crystal molecules is oriented freely, the refractive index thereof does not match the refractive index of the substrate, and the dimming function layer 85 is in a mist state. In this way, through the cooperation of the privacy film 205 and the dimming function layer 85 in the mist state, the display device is in the sharing mode.

Since the display device includes the aforementioned dimming sheet, it may have all the features and advantages of the dimming sheet described in the above embodiments, and will not be repeated here.

Figure 22:
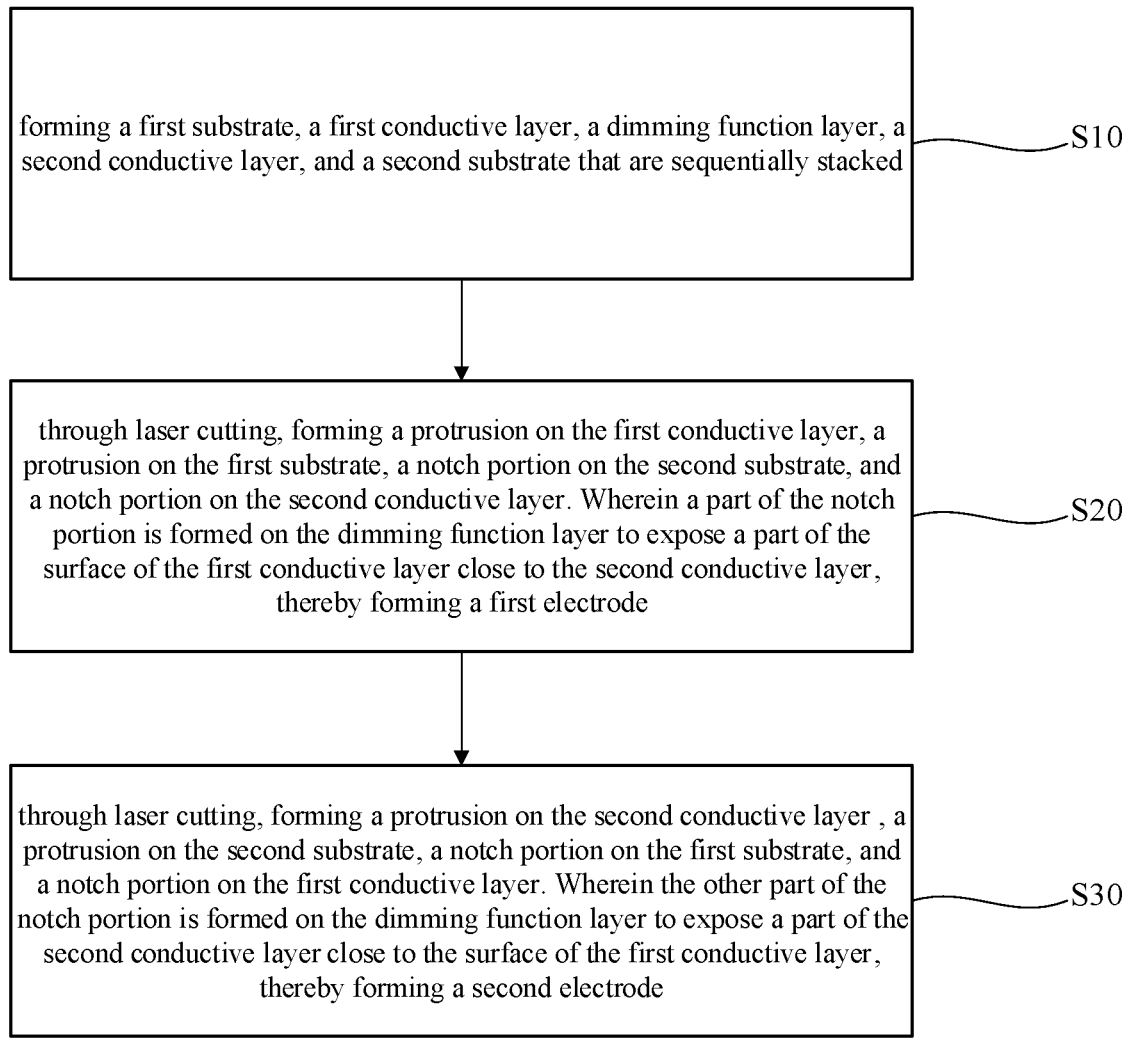
FIG. 22 is a flowchart of a method of manufacturing a dimming sheet according to embodiments of the present disclosure.

The embodiments of the present disclosure also provide a method for manufacturing a dimming sheet. Referring to FIG. 16 and FIG. 22 in conjunction, the manufacturing method shown may be performed according to the following steps.

In step S10, a first substrate 81, a first conductive layer 83, a dimming function layer 85, a second conductive layer 84, and a second substrate 82 are formed sequentially stacked. For example, the first conductive layer 83 may be formed on the first substrate 81, the second conductive layer 84 may be formed on the second substrate 82, and then the first substrate 81 and the second substrate 82 may be aligned and assembled, and the dimming function layer 85 is formed between the first conductive layer 83 and the second conductive layer 84.

In step S20, through laser cutting, a protrusion 832 is formed on the first conductive layer 83, a protrusion 812 is formed on the first substrate 81, a notch portion 823 is formed on the second substrate 82, and a notch portion 843 is formed on the second conductive layer 84. A part of the notch portion 853 is formed on the dimming function layer 85 to expose a part of the surface of the first conductive layer 83 close to the second conductive layer 84, thereby forming a first electrode 60.

In step S30, through laser cutting, a protrusion 842 is formed on the second conductive layer 84, a protrusion 822 is formed on the second substrate 82, a notch portion 813 is formed on the first substrate 81, and a notch portion 833 is formed on the first conductive layer 83. The other part of the notch portion 853 is formed on the dimming function layer 85 to expose a part of the second conductive layer 84 close to the surface of the first conductive layer 83, thereby forming a second conductive layer 80.

The embodiments of the present disclosure further provide a method for manufacturing a dimming sheet assembly, the method for manufacturing the dimming sheet assembly includes the above-mentioned method for manufacturing a dimming sheet, and it may further include the following steps:

coating conductive glue such as ACF glue on the flexible circuit board 40. For example, coating conductive glue such as ACF glue on the first contact portion 402 and the second contact portion 403 of the flexible circuit board 40; and attaching the first contact portion 402 and the second contact portion 403 with the conductive glue to the first electrode 60 and the second electrode 80, respectively, to bind the flexible circuit board 40 and the dimming sheet 8.

It should be noted that, in some embodiments according to the present disclosure, some steps in the above methods may be executed individually or in combination, and may be executed in parallel or sequentially, and are not limited to the specific operation sequence shown in FIG. 22.

It should be noted that, in the embodiments of the present disclosure, the display device may be any product or component with display function, including but not limited to, a liquid crystal display, an e-book, a mobile phone, a tablet computer, a television, a laptop computer, a digital photo frame, a navigator, etc.

Although some embodiments according to the general inventive concept of the present disclosure have been shown and described, those of ordinary skill in the art will understand that changes may be made to these embodiments without departing from the principle and spirit of the general inventive concept of the present disclosure. The scope of the present disclosure is defined by the claims and their equivalents.

What is claimed is:

1. A display device, comprising:
a back plate;
a plastic frame connected to the back plate;
a backlight module on the back plate, wherein the backlight module is configured to emit light;
a privacy film on a light emitting side of the backlight module; and
a dimming sheet on a side of the privacy film away from the back plate, wherein the dimming sheet is configured to be capable of adjusting a viewing angle of the display device,
wherein the plastic frame comprises a first surface and a side end face, the first surface of the plastic frame is a surface of the plastic frame close to the dimming sheet and opposite to a light emitting surface of the dimming sheet, the side end face of the plastic frame is a side face of the plastic frame close to the dimming sheet, the plastic frame further comprises a chamfered portion at a transition position between the side end face of the plastic frame and the first surface of the plastic frame, and the chamfered portion has a rough surface that is configured for diffracting the light incident on the chamfered portion;
wherein the display device further comprises:
a flexible circuit board, the flexible circuit board comprises a flexible circuit board body, a first contact portion and a second contact portion on the flexible circuit board body;
wherein the dimming sheet comprises a first electrode and a second electrode, and the first electrode and the second electrode are in electrical contact with the first contact portion and the second contact portion, respectively;
wherein the dimming sheet comprises a first side face close to the flexible circuit board, the first electrode comprises a first electrode part and a second electrode part, the second electrode part and the first electrode part are located on both sides of the first side face in a direction perpendicular to the first side face, and the first electrode part is protruded toward the flexible circuit board relative to the first side face;
wherein the second electrode comprises a third electrode part and a fourth electrode part, the third electrode part and the fourth electrode part are located on both sides of the first side face in the direction perpendicular to the first side face, and the third electrode part is protruded toward the flexible circuit board relative to the first side face;
wherein the dimming sheet comprises:
a first substrate and a second substrate opposite to each other;
a first conductive layer on a side of the first substrate close to the second substrate;
a second conductive layer on a side of the second substrate close to the first substrate; and
a dimming function layer between the first conductive layer and the second conductive layer; and
wherein the first electrode is located on a surface of the first conductive layer close to the dimming function layer, the second electrode is located on a surface of the second conductive layer close to the dimming function layer, the first contact portion is located on a surface of the flexible circuit board body facing the first conductive layer, and the second contact portion is located on a surface of the flexible circuit board body facing the second conductive layer.

2. The display device according to claim 1, wherein the display device further comprises a light shielding component on at least one of the back plate, the plastic frame or the dimming sheet.

3. The display device according to claim 2, wherein the dimming sheet comprises a side end face close to the plastic frame, the light shielding component comprises a first light shielding component on the first surface of the plastic frame, the first light shielding component comprises a first light shielding sub-component and a second light shielding sub-component, the first light shielding sub-component covers at least a part of the first surface of the plastic frame, and the second light shielding sub-component covers at least a part of the side end face of the dimming sheet.

4. The display device according to claim 3, wherein the light shielding component comprises a fourth light shielding component on the light emitting surface of the dimming sheet, and an orthographic projection of the fourth light shielding component on the back plate falls within an orthographic projection of the plastic frame on the back plate.

5. The display device according to claim 2, wherein the light shielding component comprises a second light shielding component on at least one of the first surface of the plastic frame and a side face of the back plate close to the dimming sheet.

6. The display device according to claim 2, wherein the light shielding component comprises a third light shielding component on the side end face of the dimming sheet,
wherein the third light shielding component comprises black ink, or the third light shielding component comprises a frame sealant that is located between the first conductive layer and the second conductive layer to encapsulate the dimming function layer.

7. The display device according to claim 1, wherein the backlight module comprises a plurality of optical film layers, an orthographic projection of at least one of the plurality of optical film layers and the privacy film on the back plate covers an orthographic projection of the dimming sheet on the back plate, and an area of the orthographic projection of at least one of the plurality of optical film layers and the privacy film on the back plate is greater than an area of the orthographic projection of the dimming sheet on the back plate.

8. The display device according to claim 7, wherein the privacy film comprises a first surface close to the backlight module and a second surface close to the dimming sheet, and at least one of the first surface of the privacy film and the second surface of the privacy film is a rough surface; and/or,
the display device further comprises a polarizer on a side of the dimming sheet away from the privacy film, and a surface of the polarizer close to the dimming sheet is a rough surface.

9. The display device according to claim 8, wherein the dimming sheet further comprises: anti-absorption particles on a surface of the dimming sheet close to the privacy film, and anti-absorption particles on a surface of the dimming sheet close to the polarizer.

10. The display device according to claim 1, wherein an area of an orthographic projection of the first electrode part on the first substrate is smaller than or equal to an area of an orthographic projection of the second electrode part on the first substrate; and/or an area of an orthographic projection of the third electrode part on the second substrate is smaller than or equal to an area of an orthographic projection of the fourth electrode part on the second substrate.

11. The display device according to claim 10, wherein a width of the first electrode part in a direction perpendicular to the first side face of the dimming sheet is smaller than or equal to a width of the second electrode part in a direction perpendicular to the first side face of the dimming sheet; and/or a width of the third electrode part in a direction perpendicular to the first side face of the dimming sheet is smaller than or equal to a width of the fourth electrode part in a direction perpendicular to the first side face of the dimming sheet; or, wherein a length of the first electrode part in a direction parallel to the first side face of the dimming sheet is smaller than or equal to a length of the second electrode part in a direction parallel to the first side face of the dimming sheet; and/or a length of the third electrode part in a direction parallel to the first side face of the dimming sheet is smaller than or equal to a length of the fourth electrode part in a direction parallel to the first side face of the dimming sheet; or, wherein a length of the first electrode in a direction parallel to the first side face of the dimming sheet is 3-10 times of a width of the first electrode in a direction perpendicular to the first side face of the dimming sheet; and/or a length of the second electrode in a direction parallel to the first side face of the dimming sheet is 3-10 times of a width of the second electrode in a direction perpendicular to the first side face of the dimming sheet.

12. The display device according to claim 10, wherein a ratio of the area of the orthographic projection of the first electrode part on the first substrate to the area of the orthographic projection of the second electrode part on the first substrate is in a range of ⅔-⅘; and/or a ratio of the area of the orthographic projection of the third electrode part on the second substrate to the area of the orthographic projection of the fourth electrode part on the second substrate is in a range of ⅔-⅘.

13. The display device according to claim 10, wherein a side of the orthographic projection of the first electrode on the first substrate that is close to the orthographic projection of the second electrode on the first substrate coincides with a side of the orthographic projection of the second electrode on the first substrate that is close to the orthographic projection of the first electrode on the first substrate.

14. The display device according to claim 10, wherein the orthographic projection of the first electrode on the first substrate and the orthographic projection of the second electrode on the first substrate are separated by a predefined distance.

15. The display device according to claim 10, wherein the first conductive layer further comprises a notch portion, and the notch portion of the first conductive layer is recessed inward relative to the first side face of the dimming sheet, the second conductive layer further comprises a notch portion, and the notch portion of the second conductive layer is recessed inward relative to the first side face of the dimming sheet.

16. The display device according to claim 15, wherein the first substrate comprises a notch portion, and an orthographic projection of the notch portion of the first conductive layer on the first substrate, an orthographic projection of the second electrode on the first substrate and the notch portion of the first substrate overlap with one another.

17. The display device according to claim 15, wherein the second substrate comprises a notch portion, and an orthographic projection of the notch portion of the second conductive layer on the second substrate, an orthographic projection of the first electrode on the second substrate and the notch portion of the second substrate overlap with one another.

18. The display device according to claim 17, wherein the dimming function layer comprises a notch portion, and an orthographic projection of the notch portion of the dimming function layer on the first substrate covers both an orthographic projection of the first electrode on the first substrate and an orthographic projection of the second electrode on the first substrate.

* * * * *